US012548968B2

(12) United States Patent
Hersman

(10) Patent No.: US 12,548,968 B2
(45) Date of Patent: Feb. 10, 2026

(54) GASEOUS LASER SYSTEMS WITH EDGE-DEFINING ELEMENT AND RELATED TECHNIQUES

(71) Applicant: Xemed LLC, Durham, NH (US)

(72) Inventor: F. William Hersman, Durham, NH (US)

(73) Assignee: XEMED LLC, Durham, NH (US)

( * ) Notice: Subject to any disclaimer, the term of this patent is extended or adjusted under 35 U.S.C. 154(b) by 0 days.

(21) Appl. No.: 19/039,289

(22) Filed: Jan. 28, 2025

(65) Prior Publication Data
US 2025/0174957 A1 May 29, 2025

Related U.S. Application Data

(63) Continuation-in-part of application No. 18/396,290, filed on Dec. 26, 2023, now Pat. No. 12,212,113, (Continued)

(51) Int. Cl.
*H01S 3/0941* (2006.01)
*H01S 3/03* (2006.01)
(Continued)

(52) U.S. Cl.
CPC .............. *H01S 3/104* (2013.01); *H01S 3/031* (2013.01); *H01S 3/034* (2013.01); *H01S 3/076* (2013.01);
(Continued)

(58) Field of Classification Search
CPC .... H01S 3/076; H01S 3/08081; H01S 3/0941; H01S 3/1115; H01S 3/227
See application file for complete search history.

(56) References Cited

U.S. PATENT DOCUMENTS 3,576,500 A * 4/1971 Gould ..................... H01S 3/031
372/60
4,903,271 A 2/1990 Yasui et al.
(Continued)

OTHER PUBLICATIONS

Rotondaro, "Passive mode-locked cesium diode-pumped alkali laser," Dec. 21, 2022, Optics Letters, vol. 48, No. 1, p. 121-122. (Year: 2022).*

(Continued)

*Primary Examiner* — Michael Carter
(74) *Attorney, Agent, or Firm* — Hayes Soloway PC

(57) ABSTRACT

Gaseous laser systems and related techniques are disclosed. Techniques disclosed herein may be utilized, in accordance with some embodiments, in providing a gaseous laser system with a configuration that provides (A) pump illumination with distinct edge surfaces for an extended depth and (B) an output beam illumination from a resonator cavity with distinct edges in its reflectivity profile, thereby providing (C) pump beam and resonator beam illumination on a volume so that the distinct edge surfaces of its pump and resonator beam illumination are shared-edge surfaces with (D) further edge surfaces of the amplifier volume at the surfaces illuminated directly by the pump or resonator beams, as defined by optical windows and (optionally) by one or more flowing gas curtains depleted of the alkali vapor flowing along those optical windows. Techniques disclosed herein may be implemented, for example, in a diode-pumped alkali laser (DPAL) system, in accordance with some embodiments.

20 Claims, 21 Drawing Sheets

Related U.S. Application Data which is a continuation of application No. 17/710,424, filed on Mar. 31, 2022, now Pat. No. 11,855,406.

(51) Int. Cl.
    *H01S 3/034*     (2006.01)
    *H01S 3/07*     (2006.01)
    *H01S 3/08*     (2023.01)
    *H01S 3/104*     (2006.01)
    *H01S 3/1115*     (2023.01)
    *H01S 3/227*     (2006.01)

(52) U.S. Cl.
    CPC ........ *H01S 3/08081* (2013.01); *H01S 3/0941* (2013.01); *H01S 3/1115* (2013.01); *H01S 3/227* (2013.01)

(56) References Cited

U.S. PATENT DOCUMENTS

| | | | | |
|---|---|---|---|---|
| 5,173,907 A | * | 12/1992 | Benda | H01S 3/1115 372/18 |
| 5,392,308 A | * | 2/1995 | Welch | G02B 6/305 372/100 |
| 9,653,869 B1 | | 5/2017 | Hersman et al. | |
| 11,031,745 B1 | | 6/2021 | Durst et al. | |
| 2004/0202220 A1 | | 10/2004 | Hua et al. | |
| 2015/0110146 A1 | | 4/2015 | Gronenborn | |
| 2017/0256913 A1 | | 9/2017 | Garnache-Creuillot et al. | |
| 2023/0318251 A1 | * | 10/2023 | Hersman | H01S 3/0941 372/55 |

OTHER PUBLICATIONS

Auslender et al., "General model of DPAL output power and beam quality dependence on pump beam parameters; experimental and theoretical", 2018, Journal of Optical Society of America B, vol. 35, Issue No. 12.

Yablon, "Demonstration of a Tunable Narrowband-Pumped Ring Alkali Laser for Superluminal Applications", FiO/LS Technical Digest Optical Society of America, OSA, 2012, 2 pages.

* cited by examiner

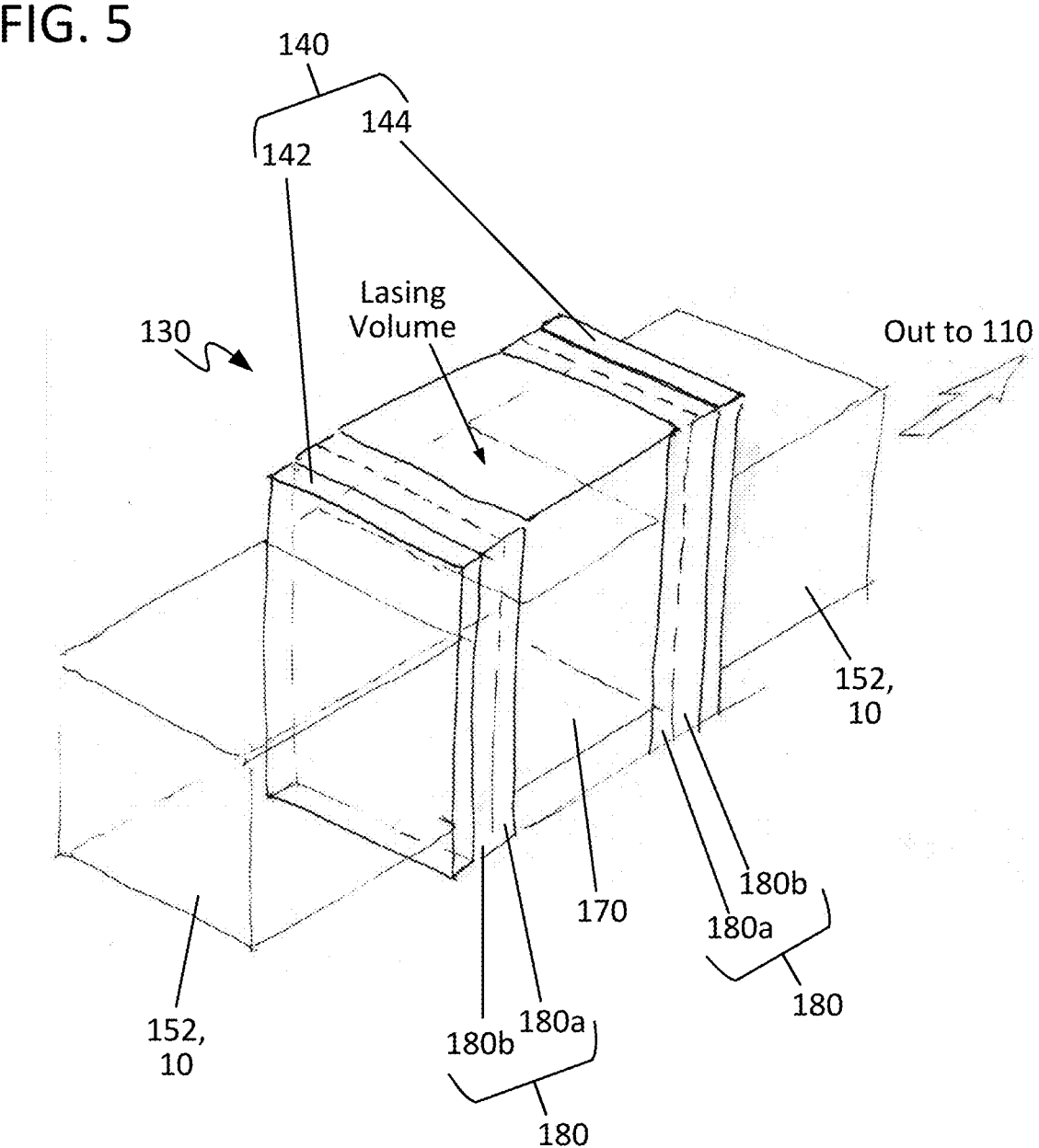

GASEOUS LASER SYSTEMS WITH EDGE-DEFINING ELEMENT AND RELATED TECHNIQUES

CROSS-REFERENCE TO RELATED APPLICATIONS

This patent application is a Continuation-in-Part of U.S. patent application Ser. No. 18/396,290, filed on Dec. 26, 2023, and now issued as U.S. Pat. No. 12,212,113 on Jan. 28, 2025, which is a Continuation-in-Part of U.S. patent application Ser. No. 17/710,424, filed on Mar. 31, 2022, and now issued as U.S. Pat. No. 11,855,406 on Dec. 26, 2023. Each of the aforementioned is herein incorporated by reference in its entirety.

FIELD OF THE DISCLOSURE

The present disclosure relates to laser systems and more particularly to flowing gas amplifier laser systems, such as diode-pumped alkali laser (DPAL) systems.

BACKGROUND

Diode-pumped lasers typically employ laser diodes as the pump beam source. Some of these lasers, such as diode-pumped alkali lasers (DPALs), employ a gaseous lasing medium including an alkali metal vapor. Diode pumping can be provided in a longitudinal manner (i.e., pump light enters the lasing medium through a surface that is shared with the output beam) or a transverse manner (e.g., pump light enters the lasing medium through a surface that is not shared with the output beam).

SUMMARY

The subject matter of this application may involve, in some cases, interrelated products, alternative solutions to a particular problem, and/or a plurality of different uses of a single system or article.

One example embodiment provides a gaseous laser system. The gaseous laser system includes an unstable resonator. The gaseous laser system also includes a lasing amplifier disposed in an optical pathway of the unstable resonator, wherein the lasing amplifier includes an optical window assembly through which a flowing lasing gas passes in operation of the gaseous laser system. The gaseous laser system also includes a pump beam source configured to emit a pump beam including pump light. The gaseous laser system also includes an edge-defining element configured to define an edge of the pump light such that a resultant pump beam is delivered to the flowing lasing gas in the lasing amplifier.

In some cases, the edge-defining element includes a mirror assembly disposed near an intersection of the pump beam and the optical pathway of the unstable resonator and configured to have the pump beam incident therewith. In some instances, the mirror assembly is configured to reflect at least a portion of the pump beam so as to define the edge of pump light incident therewith.

In some cases, the edge-defining element includes an assembly of optical elements disposed outside of the optical pathway of the unstable resonator and configured to have the pump beam pass therethrough. In some instances, the assembly of optical elements is configured to at least one of refractively optically transport and reflectively optically transport at least a portion of the pump beam so as to define the edge of pump light incident therewith. In some instances, the assembly of optical elements is configured to form an image of at least a portion of the pump beam so as to define the edge of pump light incident therewith.

In some cases, the gaseous laser system is configured to have at least one flowing gas curtain pass over an interior surface of the optical window assembly in a region through which the pump beam passes in operation of the gaseous laser system. In some instances, the at least one flowing gas curtain includes an inactive gas. In some instances, the at least one flowing gas curtain is configured to have the pump beam incident therewith so as to define the edge of pump light incident therewith.

In some cases, the pump beam source is configured for longitudinal pumping of the lasing amplifier. In some other cases, the pump beam source is configured for transverse pumping of the lasing amplifier. In some cases, the gaseous laser system is configured as a diode-pumped alkali laser (DPAL), and the flowing lasing gas includes a vapor of an alkali metal.

Another example embodiment provides a method of optically pumping a gaseous laser system. The method includes emitting a pump beam including pump light. The method also includes defining an edge of the pump light. The method also includes delivering a resultant pump beam to a flowing lasing gas of the gaseous laser system.

In some cases, defining the edge of the pump light involves a reflection process. In some instances, the reflection process includes reflecting at least a portion of the pump beam off a mirror before delivering the resultant refined pump beam to the flowing lasing gas.

In some cases, defining the edge of the pump light involves at least one of a refractive optical transport process and a reflective optical transport process. In some instances, the at least one of the refractive optical transport process and the reflective optical transport process includes focusing the pump beam through at least one lens before delivering the resultant pump beam to the flowing lasing gas.

In some cases, in delivering the resultant pump beam to the flowing lasing gas, the resultant pump beam passes through at least one flowing gas curtain provided adjacent to the flowing lasing gas. In some instances, the at least one flowing gas curtain includes an inactive gas.

In some cases, emitting the pump beam involves a longitudinal pumping process in which the pump beam and an output beam of the gaseous laser system are transmitted through at least one shared optical window. In some other cases, emitting the pump beam involves a transverse pumping process in which the pump beam and an output beam of the gaseous laser system are transmitted through different optical windows. In some cases, the gaseous laser system is configured as a diode-pumped alkali laser (DPAL), and the flowing lasing gas includes a vapor of an alkali metal.

Another example embodiment provides a gaseous laser. The gaseous laser includes a gain medium with an interior volume within the substance of the gain medium that is illuminated by one or more pump laser source(s) entering the volume. The gaseous laser also includes edge surfaces fully enclosing the interior volume where the gain of the medium changes from a low value to a high value. The gaseous laser further includes one or more pump light sources whose illumination of the interior volume of the gain medium has an intensity distribution in the plane perpendicular to its direction of propagation that is configured to transition abruptly from low to high intensity (e.g., the edge of the pump beam), thereby delineating one or more edge surfaces of the gain medium, where the transition in pump illumination defines that surface.

In some cases, the gaseous gain medium is flowing so that the streamlines of the flow define planes that are also edge surfaces where the gain of the medium changes from a low value to a high value, and one or more additional surface of the gain medium are defined by the edge of the pump beam (i.e., a spatially abrupt transition in pump light intensity).

In some cases, the configuration is one of longitudinal pumping (e.g., pump light enters the gain medium through a surface that is shared with the output beam), the surfaces where the pump beam and output beam cross the medium boundary and enter/exit the medium are defined by flow streamlines along the windows, with or without a flowing inactive gas curtain, and the perimeter surface enclosing and defining the pump region in the plane perpendicular to the pump beam and output beam is defined at least partially by a spatially abrupt transition in pump light intensity (e.g., the edge of the pump beam). In some such instances, the illumination pattern of the laser output beam formed by the unstable resonator (e.g., the magnified image of the output coupling mirror reflected from the high-reflectivity mirror) coincides with the perimeter surface that encloses the pumped region.

In some cases, the configuration is one of transverse pumping (e.g., pump light enters the gain medium through a surface that is not shared with the output beam), the surface(s) where the pump beam crosses the medium boundary and enters the medium are defined by flow streamlines along the windows, with or without a flowing inactive gas curtain, the surface(s) where the output beam crosses the medium boundary and enters/exits the medium are defined by flow streamlines along the windows, with or without a flowing inactive gas curtain, and the perimeter defining the pump region along the gas flow direction is defined at least partially by a spatially abrupt transition in pump light intensity. In some such instances, the illumination pattern of the output beam formed by the unstable resonator (e.g., the magnified image of the output coupling mirror reflected from the high-reflectivity mirror) coincides with the rectilinear surface that encloses the pumped region.

In some cases, the illumination pattern of the pump beam within the pumped region is approximately uniform. In some cases, the illumination transition from low to high intensity (e.g., the edge of the pump beam) is more narrowly defined using a mirror, thereby confining pump light to be inside the medium boundary that otherwise would diverge beyond the surface of the gain region. In some cases, the mirror placement confines the pump light to a circular, polygonal, rectangular, oval, or circular illumination pattern. In some cases, the mirror placement confines the pump light to a rectangular illumination pattern. In some cases, the placement of lenses confines the pump light to a rectangular illumination pattern. In some cases, the flow defines the amplifier medium substance with planar edge surfaces including windows and/or flowing gas curtains, where the output beam includes parallel rays with a perimeter defined by the geometry of the unstable resonator, and the pump beam is tailored to have abrupt edges so that the amplifier gain medium includes the volumetric intersection of the flowing lasing gas, the pump beam, and the output beam.

In some cases, the pump source is oriented such that the edge of its illumination along the fast-axis direction, which has lower divergence and better spatial definition than that of its slow axis, is directed so as to define one or more edge surfaces of the pump light along the gas flow direction, thereby forming one or more edges of the interior volume of the gain medium for an extended depth at the lasing gas flow entrance and exit.

Another example embodiment provides a gaseous laser system. The gaseous laser system includes at least one pump beam source configured to emit at least one pump beam. The gaseous laser system further includes an amplifier region having at least one edge surface. The gaseous laser system further includes an unstable resonator configured to produce a resonator beam and an output beam, the unstable resonator including an output coupler having a perimeter configured to define at least one resonator beam edge surface such that the resonator beam illuminates with substantially full intensity at least a majority of the amplifier region that is pumped by the at least one pump beam.

In some cases, the resonator beam illuminates substantially all the amplifier region which is pumped by the at least one pump beam. In some cases, the resonator beam provides no illumination upon a portion of the amplifier region which is not pumped by the at least one pump beam.

In some cases, the output coupler includes: a plurality of separate elements configured for transmission of the output beam; and one or more feedback optics configured to define a boundary between the resonator beam and the output beam, wherein the perimeter of the output coupler is configured to shape the resonator beam. In some cases, the output coupler includes: a beam deflector having an inner perimeter configured to define a boundary between the resonator beam and the output beam, wherein the perimeter of the output coupler is configured to shape the resonator beam; and a feedback optic situated optically downstream of the beam deflector. In some cases, the output coupler includes an inner feedback optic that includes an outer perimeter that is configured to define the resonator beam such that the at least one beam edge of the output beam is substantially bow tie-shaped.

In some cases, the output coupler includes an inner feedback optic. Also, the system is configured with a bow tie-shaped pump region and an edge of the inner feedback optic of the output coupler that together produce a substantially bow tie-shaped edge surface of the resonator beam.

In some cases, the output coupler is configured to deflect the at least one pump beam into a closed loop. In some such instances, the output coupler includes an inner feedback optic that is situated at a non-perpendicular angle relative to an optical axis of the resonator beam. In some other such instances, the output coupler includes an inner cavity curved optic configured to deflect the resonator beam into the closed loop.

In some cases, the system further includes an angled element configured to deflect the resonator beam into a closed loop.

In some cases, the at least one pump beam source is configured for radial-transverse pumping of the system. In some such instances, in being configured for radial-transverse pumping of the system, the at least one pump beam source is configured to produce radial pump beam edge surfaces. In some such instances, radial pump beam edge surfaces coincide with edge surfaces of the resonator beam. In some such instances, the coinciding depends, at least in part, on a shape of the output coupler. In some other such instances, the coinciding is independent of a shape of the output coupler.

In some cases, the at least one pump beam includes: a first pump beam entering the amplifier region from a first direction; and a second pump beam entering the amplifier region from a second direction opposing the first direction. Also, the first pump beam impinges on the second pump beam. Furthermore, the system is configured for rotating polarization of at least one of the first pump beam and the second pump beam. In some such instances, the system further includes a polarizing reflector configured to separate incoming pump beams from outgoing pump beams of the at least one pump beam.

In some cases, the system is configured for transverse pumping with converging beam edge surfaces of the at least one pump beam that coincide with beam edges of the resonator beam.

In some cases: the at least one pump beam includes a first pump beam and a second pump beam; and the system further includes at least one wedge-shaped structure disposed between a wedge-shaped profile of the first pump beam and a wedge-shaped profile of the second pump beam. In some such instances, the at least one wedge-shaped structure is configured to assist with thermal management of the system.

In some cases, the gaseous laser system is configured to have a gas mixture flowing therethrough to provide the amplifier region, the gas mixture including a gas and an active lasing agent. In some such instances, the gaseous laser system is configured as a diode-pumped alkali laser (DPAL); and the active lasing agent includes a vapor of an alkali metal.

Another example embodiment provides a gaseous laser system configured to produce a pulsed output beam. The system includes an unstable resonator configured to produce a resonator beam having at least one edge surface which coincides with at least one edge surface of an amplifier region of the system. The system further includes a saturable absorber configured to lock a longitudinal mode of the unstable resonator in production of the pulsed output beam.

In some cases, the unstable resonator includes: a first plurality of high-reflectivity mirrors disposed on a first side of the amplifier region; and a second plurality of high-reflectivity mirrors disposed on a second side of the amplifier region, opposite the first side; wherein a constituent mirror of the first plurality and a constituent mirror of the second plurality form a corresponding mirror pair separated from each other by a distance equal to a sum of their respective focal lengths.

In some cases, the unstable resonator includes an output coupler oriented at an angle that causes a portion of the resonator beam to be deflected out of alignment with a main optical axis of the unstable resonator to be received by the saturable absorber.

In some cases, the unstable resonator includes an output coupler having: a reflective interior portion which is configured to deflect a portion of the resonator beam out of alignment with a main optical axis of the unstable resonator to be received by the saturable absorber; and a light-transmissive perimeter portion which at least partially surrounds the reflective interior portion and which is configured to permit transmission of the pulsed output beam.

In some cases, the saturable absorber is configured to receive a portion of the resonator beam which has been deflected out of alignment with a main optical axis of the unstable resonator and to attenuate at least one beam mode therein. In some instances, the saturable absorber is disposed at a focus of said deflected portion of the resonator beam.

In some cases, the system further includes: a plane polarizer configured to impose a preferred polarization on a portion of the resonator beam which has been deflected out of alignment with a main optical axis of the unstable resonator; a first quarter-waveplate; and a second quarter-waveplate having an orientation opposite that of the first quarter-waveplate such that a circulating beam returns to plane polarization with the preferred polarization. In some instances, one of either the first quarter-waveplate or the second quarter-waveplate is configured to cause said deflected portion of the resonator beam to become substantially circularly polarized.

In some cases, the system further includes a periodic beam shutter configured to receive a portion of the resonator beam which has been deflected out of alignment with a main optical axis of the unstable resonator.

In some cases, the system further includes an electron paramagnetic resonance (EPR) cell disposed within a collimated region of a path of a portion of the resonator beam which has been deflected out of alignment with a main optical axis of the unstable resonator. In some instances, the EPR cell is configured to enclose at least one of an alkali vapor, a buffer gas, and a quenching gas. In some instances, in operation of the system, the EPR cell is configured to be immersed in a magnetic field which is substantially transverse to a propagation direction of said deflected portion of the resonator beam. In some instances, the EPR cell is disposed along an optical pathway of said deflected portion of the resonator beam in a region where said deflected portion of the resonator beam exhibits circular polarization.

In some cases, the system further includes a prism disposed between the unstable resonator and the saturable absorber, wherein the prism is configured to receive a portion of the resonator beam which has been deflected out of alignment with a main optical axis of the resonator beam.

In some cases, the unstable resonator includes: an output coupler having a reflective portion; a first plurality of high-reflectivity mirrors disposed on a first side of the amplifier region; and a second plurality of high-reflectivity mirrors disposed on a second side of the amplifier region, opposite the first side. Additionally, the system further includes a chicane segment configured to receive a portion of the resonator beam which has been deflected out of alignment with a main optical axis of the unstable resonator, wherein the chicane segment includes a pair of high-reflectivity chicane mirrors configured such that (a) a path length of a circuit from the second plurality of high-reflectivity mirrors to the reflective portion of the output coupler, through the pair of high-reflectivity chicane mirrors, and back to the second plurality of high-reflectivity mirrors is substantially equal to (b) a path length from the second plurality of high-reflectivity mirrors to the first plurality of high-reflectivity mirrors and back to the second plurality of high-reflectivity mirrors. In some instances, the chicane segment further includes: a plane polarizer disposed along an optical pathway between the pair of high-reflectivity chicane mirrors; an electron paramagnetic resonance (EPR) cell disposed along the optical pathway between the pair of high-reflectivity chicane mirrors; and a first waveplate disposed between the plane polarizer and the EPR cell along the optical pathway between the pair of high-reflectivity chicane mirrors. In some such instances, the chicane segment further includes a second waveplate disposed either after the EPR cell or before the plane polarizer such that a preferred plane polarization is restored to said deflected portion of the resonator beam by the second waveplate.

In some cases, the system is configured to have a gas mixture flowing therethrough to provide the amplifier region, the gas mixture including a gas and an active lasing agent. In some instances: the system is configured as a diode-pumped alkali laser (DPAL); and the active lasing agent includes a vapor of an alkali metal.

In some cases, the system is configured for transverse pumping via at least one pump beam having at least one edge surface which coincides with the at least one edge surface of the resonator beam and the at least one edge surface of the amplifier region.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 5 illustrates another partial view of the system of FIG. 1, in accordance with an embodiment of the present disclosure.

Figure 1:
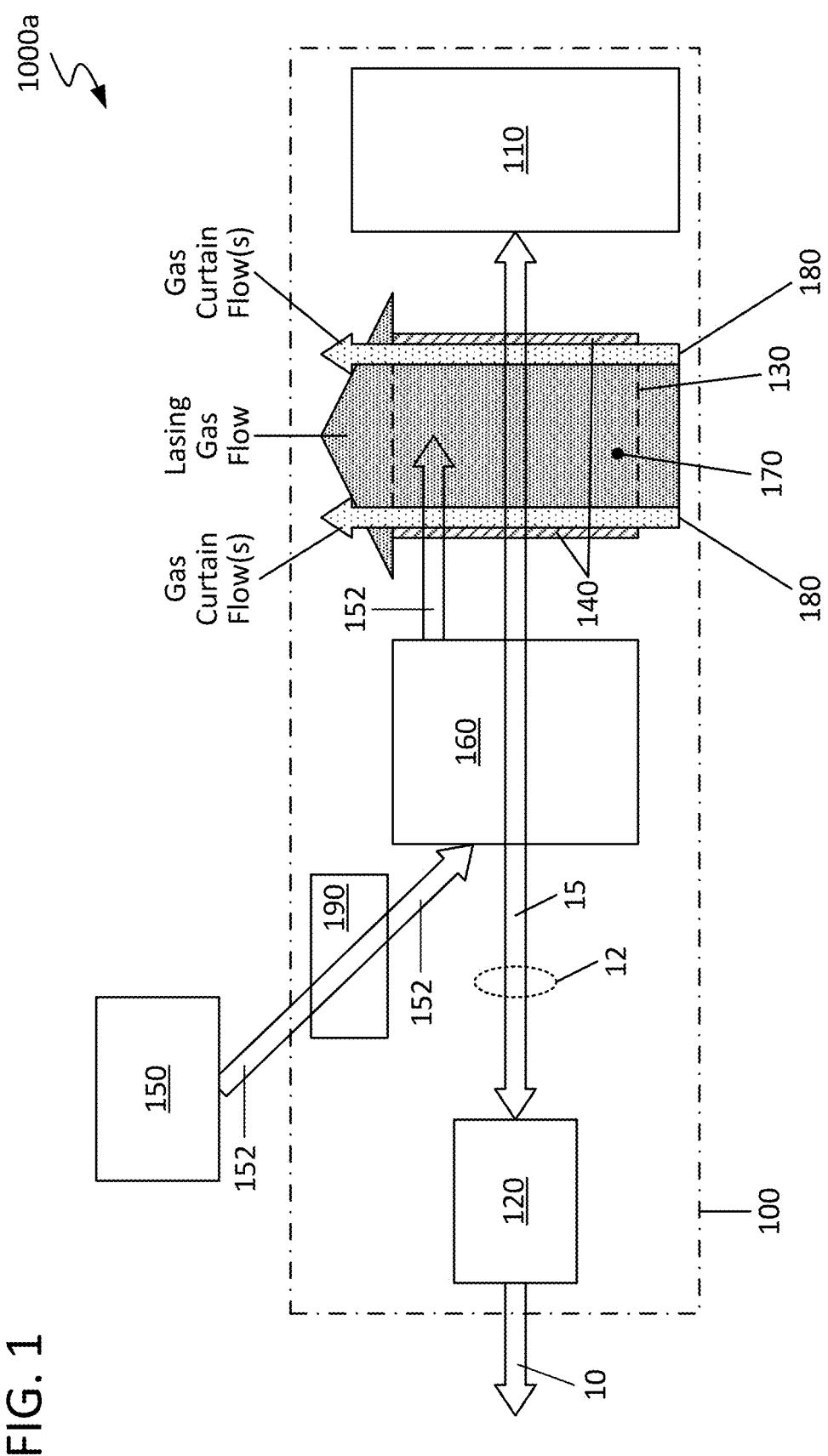
FIG. 1 illustrates a gaseous laser system configured for longitudinal pumping, in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

Gaseous laser systems and related techniques are disclosed. Techniques disclosed herein may be utilized, in accordance with some embodiments, in providing a gaseous laser system with a configuration that provides (A) pump illumination with distinct edge surfaces for an extended depth and (B) an output beam illumination from a resonator cavity with distinct edges in its reflectivity profile, thereby providing (C) pump beam and resonator beam illumination on a volume so that the distinct edge surfaces of its pump and resonator beam illumination are shared-edge surfaces with (D) further edge surfaces of the amplifier volume at the surfaces illuminated directly by the pump or resonator beams, as defined by optical windows and (optionally) by one or more flowing gas curtains depleted of the alkali vapor flowing along those optical windows. Techniques disclosed herein may be implemented, for example, in a diode-pumped alkali laser (DPAL) system, in accordance with some embodiments. Numerous configurations and variations will be apparent in light of this disclosure.

General Overview

Diode-pumped alkali lasers (DPALs) offer a promising technology for implementing a single-aperture beam with favorable characteristics. Since a DPAL is a gas laser, it does not suffer from many of the power limitations of solid lasers, such as thermal lensing. The transitions of interest are in the near-infrared, which is shorter in wavelength than existing approaches, so that the diffraction-limited output beam may propagate a greater distance for a given divergence. The difference between the energy of the pump photon and the output beam photon—the quantum defect energy between the P3/2 and P1/2 levels—is only of order a couple percent of their average, offering the potential for very high optical-to-optical conversion efficiencies.

Alkali atoms cycle among three levels to convert pump photons to beam photons. They are (i) resonantly pumped to the second excited state (the P3/2 level), (ii) collisionally quenched to the lasing state (the P1/2 level), and then (iii) transition to the ground state (the S1/2 level), thereby delivering amplification to the output beam. In the limit of very high pump and output beam intensity, and with high collisional quenching rate, the cycle rate can far exceed the natural decay rate associated with maintaining a continuous population in the P-states. In this limit, the optical-to-optical efficiency approaches the quantum defect fraction (i.e., the difference between the P3/2 and P1/2 level energies divided by their average) of a couple percent. However, there is also a threshold that must be overcome—the pump beam must have sufficient intensity to "bleach" the levels, achieving the population inversion that is required before lasing begins. Due to the constant rate of natural spontaneous decay of the excited states, this penalty to the optical-to-optical efficiency is always present at a constant energy loss rate. In some configurations, the output beam in the amplifier region exceeds the pump intensity. Consequently, the higher the pump intensity that is achieved above lasing threshold, the greater the portion of the pump beam that can be converted to output beam.

These considerations have led practitioners to design and implement DPAL pump illumination distributions that seek high efficiency by concentrating the pump light to maximize the pump intensity. Similar logic applies to concentrating the intensity of the output beam in the region where the pump light is most intense. For example, consider FIG. 12A, which illustrates an existing approach to pump beam intensity distribution for an existing DPAL system. Here, the pump beam intensity impinges on a flowing lasing gas as a function of position along one-dimension (e.g., the slow-axis dimension of a pump array consisting of several diode array bar stacks). As can be seen, the pump beam intensity is maximized in the center and made as spatially narrow as possible. This illumination pattern may be accomplished, for example, by inclining several diode array bar stacks so that their central rays meet at the same spot when they reach the flowing lasing gas. The distribution may have different widths along the vertical and horizontal directions, which may be associated with the fast and slow axes of the pump array. After collimation by a fast-axis collimating lens, the propagation in the fast axis has very low divergence, so that the illumination pattern along this direction is determined primarily by the height of the stack and directional pointing. The propagation in the slow axis, however, has much larger divergence. Constraining the dimension of the spatial illumination pattern along the slow axis has led to the perceived requirement that the pump laser stacks be positioned close to the amplifier region. Increasing the number of stacks illuminating the amplifier region while maintaining proximity results in placing the stack arrangement to fill a conical pattern out to angles that approach 45°. The convergence of these paths is optimally placed at the center of the amplifier, diverging rapidly with displacement from the center and decreasing in intensity away from this central point. Consequently, the depth of the amplifier region has been limited to only a few centimeters.

This existing strategy which maximizes the pump intensity within a small region does not lead to maximum performance of the full system. On an atomic level, the cycle rate depends not only on the pump intensity, but also the quenching rate between the P3/2 and P1/2 levels, and the lasing beam intensity. Each atom can absorb a pump beam photon only as fast as it can deliver it to the output beam. The quenching rate is uniform, being determined by the pressure of the helium buffer/quenching gas and the partial pressure of any (optional) hydrocarbon or fluorocarbon molecular quenching agent. Then, on a local level, full absorption of the pump beam depends on the optical thickness: the concentration of the alkali atoms (in the absorbing ground state) times the physical thickness of the medium. However, if the pump beam has an intensity maximum, then it also will have regions where the intensity drops off with distance from that maximum. Unfortunately, the optimal choice of optical thickness also drops with distance. For an operating DPAL, it is not feasible to vary the optical thickness. The amplifier region in such a system must be chosen with a single alkali vapor concentration that is a compromise between the choice that would be optimal for the region of greatest pump intensity and the regions with lesser pump intensity. Such a compromise can result in the pump beam penetrating completely through the gain medium in regions where it is most intense, while regions of the amplifier where the pump beam is less intense have alkali concentrations that are unfavorably high. As the pump beam attenuates passing through the amplifier in these regions, it may not even exceed lasing threshold near the rear of the amplifier.

The output beam is generally formed in a resonator—a cavity with two mirrors (i.e., a high-reflectivity mirror and an output coupler mirror) that define the output beam direction. An unstable resonator is characterized by a magnification whose absolute value exceeds unity. As the beam reflects between the mirrors, the illumination pattern of the resonator beam is magnified so that power escapes outside the perimeter of the output coupling mirror. The illumination pattern of the resonator beam returning to the high-reflectivity mirror from the output coupler is defined by the reflectivity profile of the output coupler, which drops to zero reflectivity at its perimeter. After reflecting off the output coupler (and optionally passing through an intermediate focus), the resonator beam diverges while passing back through the amplifier medium, reaching its maximum transverse size as it reaches the high-reflectivity mirror. After reflecting off that mirror, the magnified resonator beam becomes parallel, with an intensity profile and a perimeter defined by the magnified illuminated region and the reflectivity of the output coupler. As it passes through the amplifier medium, each region of the resonator beam has its intensity modified according to the localized gain of the region it is passing through. Once it separates from the output coupler, the output beam consists of parallel rays defined by the magnified beam pattern minus the reflected intensity removed from the central region. Since the central region may be only partially reflective, some fraction of the output power may pass through.

The size and shape of the perimeter of the unstable resonator cavity elements (e.g., the output coupler) can be chosen to achieve a given target performance of the DPAL. The size and shape of these elements may be chosen, for example, to extract beam from the pumped region and to avoid sending the output beam through regions of the flowing lasing gas that do not have sufficient pump intensity to achieve a population inversion. The optimal choice of pump beam perimeter size and shape is a compromise if the pump intensity tapers from a maximum intensity (where excess pump beam penetrates through the amplifier medium thickness and emerges out the back under-utilized) to a lower intensity (where insufficient pump beam intensity is exhausted midway, leaving the rearmost layer of the amplifier medium without a population inversion). Indeed, if the cavity elements are chosen so that the output beam is too large, much of the output beam may be forced to propagate through regions of the amplifier medium with negative gain (i.e., attenuation).

The dimensions of the amplifier region, combined with the local population inversion, determine not only the gain through the system along the path of the output beam, but also provide gain in other directions. Spontaneous emission from either the P3/2 or P1/2 state to the S1/2 ground state is directionally isotropic and can be amplified due to the population inversions that are present in the system. This so-called amplified spontaneous emission (ASE) is a power loss mechanism that depletes the population inversions. Since the gain is exponential, the power out the sides of the amplifier medium becomes significant if the spatial size of the amplifier medium transverse to the beam direction (significantly) exceeds its dimension along the beam. The ratio of the dimension along the beam path to the transverse dimension is often termed the dimensional "aspect ratio." Current practice is limited to aspect ratios of approximately 1:2 (i.e., one-half).

Thus, and in accordance with some embodiments of the present disclosure, gaseous laser systems and related techniques are disclosed. Techniques disclosed herein may be utilized, in accordance with some embodiments, in providing a gaseous laser system with a configuration that provides (A) pump illumination with distinct edge surfaces for an extended depth and (B) an output beam illumination from a resonator cavity with distinct edges in its reflectivity profile, thereby providing (C) pump beam and resonator output beam illumination on a volume so that the distinct edge surfaces of its pump and resonator beam illumination are shared-edge surfaces with (D) further edge surfaces of the amplifier volume at the surfaces illuminated directly by the pump or resonator beams, as defined by optical windows and (optionally) by one or more flowing gas curtains depleted of the alkali vapor flowing along those optical windows. Techniques disclosed herein may be implemented, for example, in a diode-pumped alkali laser (DPAL) system, in accordance with some embodiments.

In accordance with some embodiments, systems disclosed herein may be configured, for example, with a gaseous laser with a flowing lasing gas (i.e., amplifier medium) that is optically pumped with diode laser arrays in an unstable resonator to form a collimated output beam. In accordance with some embodiments, at least two of the surfaces of the amplifier volume may be defined by optical windows and (optionally) one or more flowing gas curtains such that the flowing lasing gas itself does not extend beyond those boundaries. In accordance with some embodiments, definition of the edge surfaces of (i) the pump beam and (ii) the output beam and co-locating those surfaces with one another and/or the edge surfaces of (iii) the flowing lasing gas may contribute to improvements in efficiency and power-in-bucket metrics.

In accordance with some embodiments, techniques disclosed herein may involve, for example, spatially matching laser pump illumination with the flowing lasing gas and unstable resonator beam formation geometries. In accordance with some embodiments, techniques disclosed herein may involve, for example, defining the edge surfaces of the amplifier volume and co-locating those surfaces wherever possible with the edge surfaces of (i) the pump beam, (ii) the output beam, and (iii) the flowing lasing gas.

In accordance with some embodiments, techniques disclosed herein may involve arranging pump laser(s) to have a sharp cutoff (e.g., in the gas flow direction, if applicable) and making that edge surface substantially identical with the output beam, also with a sharp cutoff. In at least some cases, the co-location of those edge surfaces along the gas flow direction may eliminate (or otherwise reduce) regions of geometric inefficiency (e.g., pumped regions with active lasing medium that are not illuminated by the output beam and/or regions with active lasing medium that are illuminated by the output beam but not pumped). As will be appreciated in light of this disclosure, that sharp cutoff may be achieved, for example, using the fast-axis edge of the pump laser beam, in accordance with some embodiments. If there is no optical transport, it still may provide a sufficiently sharp edge. Also, if there is no optical transport, the slow axis may be smeared out, and it may be desirable to utilize an end mirror, though that may impact the ability to achieve sufficient intensity. If, however, there is optical transport, then sufficient intensity above threshold may be achieved, for example, by concentrating the light in the fast-axis direction. This may be accomplished, for example, with a focusing pair (e.g., an afocal telescope).

In accordance with some embodiments, techniques disclosed herein may be implemented, for example, in a gaseous laser system (e.g., DPAL system) configured for longitudinal pumping. In such cases, the pump and output beams generally may define the x-y profile forming a given shape (e.g., square, rectangle, octagon, circle, etc.), while the z-direction may be delimited by optical windows and (optionally) flowing gas curtains where both beams come through. In accordance with some other embodiments, techniques disclosed herein may be implemented, for example, in a gaseous laser system (e.g., DPAL system) configured for transverse pumping. In such cases, the edges of both the pump and output beams generally may define the gas inflow and outflow boundaries of the amplifier regions, and optical windows and (optionally) flowing gas curtains generally may define all sides (e.g., four sides), together with a co-located edge of one of the beams (either pump or output). In at least some instances, the gas inflow and outflow boundaries along the gas flow direction generally may be due to the edge(s) of both the pump and output beams, in accordance with some embodiments. In at least some instances, at least one of the edges may be defined along the direction of the fast axis of the pump laser, which offers better definition in its spatial and angular distribution, thereby defining an edge surface for an extended depth. In accordance with some embodiments, techniques disclosed herein may be used to provide a DPAL system configured to illuminate a sharp cutoff at an edge surface in the gas flow direction.

As will be appreciated in light of this disclosure, recognizing the importance of definition and co-location of the edges of the pump and output beams with one another and with the edges of the amplifier for an extended depth runs counter to existing thinking and approaches. Some existing approaches include considerations for an output coupling optic with tapering reflectivity, intended to reduce the definition of the edge of the output beam (i.e., make it vaguer).

Also, some existing approaches include considerations to reflect back into the amplifier medium that portion of the pump power from the central region of highest intensity that penetrates through the amplifier medium for a second pass to harvest its power, which is evidence that it was not optimized in the original design of such existing approaches. More specifically, some existing approaches seek to reduce pump beam spot size by adding custom prisms, angled in quadrants, that deflect beams that emanate from outer stripes on each bar inward toward the center along the slow axis and deflect beams that emanate from the outer bars on the diode array stack inward toward the center along the fast axis. The angled pump arrays produce a pumped gain region which has a spatial waist in the center of the amplifier region and grows transversely moving axially, towards the front and rear. For much of the amplifier length along the beam, the width exceeds the length, resulting in appreciable amplified spontaneous emission (ASE). Thus, an increase of either of these dimensions is counterintuitive. Regarding the output beam in a transversely pumped arrangement, some existing approaches have utilized a polygonal output coupler without concomitant considerations given to defining amplifier surfaces coinciding with that polygonal boundary, resulting in pumped regions with no stimulated emission from the output beam cavity. Some existing approaches also suffer from much of the output beam passing through regions of negative gain, especially near the perimeter, as described above.

Contrary to these existing approaches, and as disclosed herein, it may be desirable, at least in some instances, to achieve a pump beam intensity that is (A) uniformly high (B) in a given pattern/shape (C) out to well-defined edges (D) for an extended depth, in accordance with some embodiments. To accomplish this, it may be desirable, at least in some instances, to transport the pump beam's fast-axis light such that it illuminates a well-defined portion of the amplifier region such that the edge of that fast-axis illumination defines one or more edge surfaces for an extended depth. Another approach to that end is, in accordance with some embodiments, to de-magnify the pump beam light along the fast axis with an optical transport, concentrating its power. As the divergence of the fast and slow axes may differ, for instance, by a factor of one hundred, the increase in the fast-axis divergence that may result from this concentration of power still may permit the fast-axis illumination to sufficiently define an edge surface for an extended depth. Another approach is, in accordance with some embodiments, to magnify the slow-axis pump light with an optical transport, to increase its spatial size while reducing its divergence. This approach may allow the slow-axis light to provide improved definition of edge surfaces for an extended depth. While expanding the slow-axis light and maintaining pump intensity may require further compression of fast-axis light, this approach may provide a pump beam that has divergence along the slow axis that more closely matches that of the fast axis, so that the pump beam may propagate through an extended amplifier region while maintaining well-defined edge surfaces to a greater depth along both axes as closely as possible. As will be appreciated in light of this disclosure, some combination of these approaches may be utilized together to achieve a target pump intensity and spatial profile as a function of depth, in accordance with some embodiments. Furthermore, to allow significant de-magnification along the fast-axis direction while still achieving high intensity and a pump beam size along the fast axis comparable to that along the slow-axis direction, a design utilizing a pump beam source with a very asymmetric shape (e.g., a stack of many bars) may be desirable (at least in some cases), in accordance with some embodiments.

Another approach is to confine the slow-axis pump light with edge mirrors, in accordance with some embodiments. A pump light illumination pattern having a generally circular or polygonal shape may be provided, in accordance with some embodiments, by using the high-spatial definition of the fast-axis light to define the edge while diffusing the light propagating toward the center. In accordance with some embodiments, this arrangement may be augmented, for example, with a circumscribing mirror (or mirror array) to constrain stray or divergent pump light and reflect it back within the perimeter. In accordance with other embodiments, this arrangement may be augmented with a spatially defining mask, to absorb the tails of the pump beam, preventing them from delivering heat to the amplifier region, if their trajectory would prevent them from contributing to the output beam anyway.

As will be further appreciated in light of this disclosure, techniques disclosed herein may involve one or more generally counterintuitive concepts. For example, rather than incorporating elements and system refinements that narrow the spatial distribution of the pump light, like described above in relation to the prior art of FIG. 12A, techniques disclosed herein may be used to expand the slow-axis spatial distribution, reduce its divergence, and improve its delineation of a well-defined edge surface for an extended depth, even if they broaden the spatial distribution of pump light illumination on the lasing gas, in accordance with some embodiments. That edge surface of the pump beam then may serve as the choice for the edge surface of the output beam, which, together with amplifier edges accomplished by the optical windows (or gas curtains flowing along the optical windows), then may determine the size and shape of the amplifier region, in accordance with some embodiments. In turn, this may determine the size and shape of the perimeter of the output coupling optic, in accordance with some embodiments.

In accordance with some embodiments, techniques disclosed herein may be utilized to provide a highly desirable configuration for pumping a DPAL with an intensity that is uniformly above threshold. As will be appreciated in light of this disclosure, efficient pumping of a DPAL may involve illumination intensities of a few kilowatts per square centimeter, but typical diode stacks may produce closer to only 200 W/cm$^2$. Rather than overlapping pump beams from various angles to achieve, for instance, a ten-fold increase in intensity, techniques disclosed herein may utilize optical demagnification (e.g., approximately ten-fold) along the fast-axis, optionally with a beam-combining element that may allow tiling the amplifier surface with a tessellated pump beam that is still collimated along the fast axis, in accordance with some embodiments. By (optionally) choosing the edges of this beam along the fast axis to lie perpendicular to the flow direction, the pump beam edge surface may be shared by the output beam edge, in accordance with some embodiments. By largely preserving the fast-axis collimation, the amplifier region may be pumped from both sides without the two pump arrays jeopardizing one another. This may be accomplished, for example, using a small angle between the impinging beam axes, in accordance with some embodiments. Alternatively (or additionally), the polarization of one of the pump beams may be rotated by a half-wave plate so that, when the pump beams emerge on the opposite side, they can be separated from the incoming pump beam using a polarization splitter, in accordance with some embodiments. By using two-sided pumping, the magnification of each pump beam may be reduced (e.g., by half, such that there is a five-fold concentration rather than ten-fold), in accordance with some embodiments. The slow-axis direction then may be defined, in accordance with some embodiments, by using an optical method to create an image within the amplifier or by using side mirrors to contain the slow-axis light, either optionally being augmented by a flowing side window to assist in defining the side surfaces of the amplifier region. The depth of the amplifier region then may approach or exceed the transverse dimension, reaching an aspect ratio that approaches or exceeds unity, in accordance with some embodiments.

As will be appreciated in light of this disclosure, techniques disclosed herein may be used, in part or in whole, to improve any of a wide range of existing DPAL systems. For example, in accordance with some embodiments, techniques disclosed herein may be utilized in relation to a DPAL system like that described in U.S. Pat. No. 9,653,869, titled "Optical Surface Preservation Techniques and Apparatus," the disclosure of which is herein incorporated by reference in its entirety.

Longitudinally Pumped System Architecture and Operation

FIG. 1 illustrates a gaseous laser system 1000a configured for longitudinal pumping, in accordance with an embodiment of the present disclosure. As can be seen, system 1000a may include an unstable resonator 100 including a high-reflectivity mirror 110 and an output coupler 120, a lasing amplifier 130, and an optical window assembly 140. As can be seen further, system 1000a may include one or more pump beam sources 150, together with one or more beam-shaping optics 190 (for the fast and slow axes), and a pump beam edge-defining element 160 (e.g., such as a mirror, optical element, and/or mask assembly) for longitudinal pumping of lasing amplifier 130 via one or more pump beams 152 through a window assembly 140 (e.g., a forward end window 142 and/or a rearward end window 144) to illuminate the front and/or rear of a flowing lasing gas 170 (e.g., gain medium). In its operation, system 1000a may produce one or more output beams 10. In operation of system 1000a, a resonator beam 15 propagates between high-reflectivity mirror 110 and output coupler 120 and through lasing amplifier 130. Each of these elements is discussed in turn below.

Figure 2:
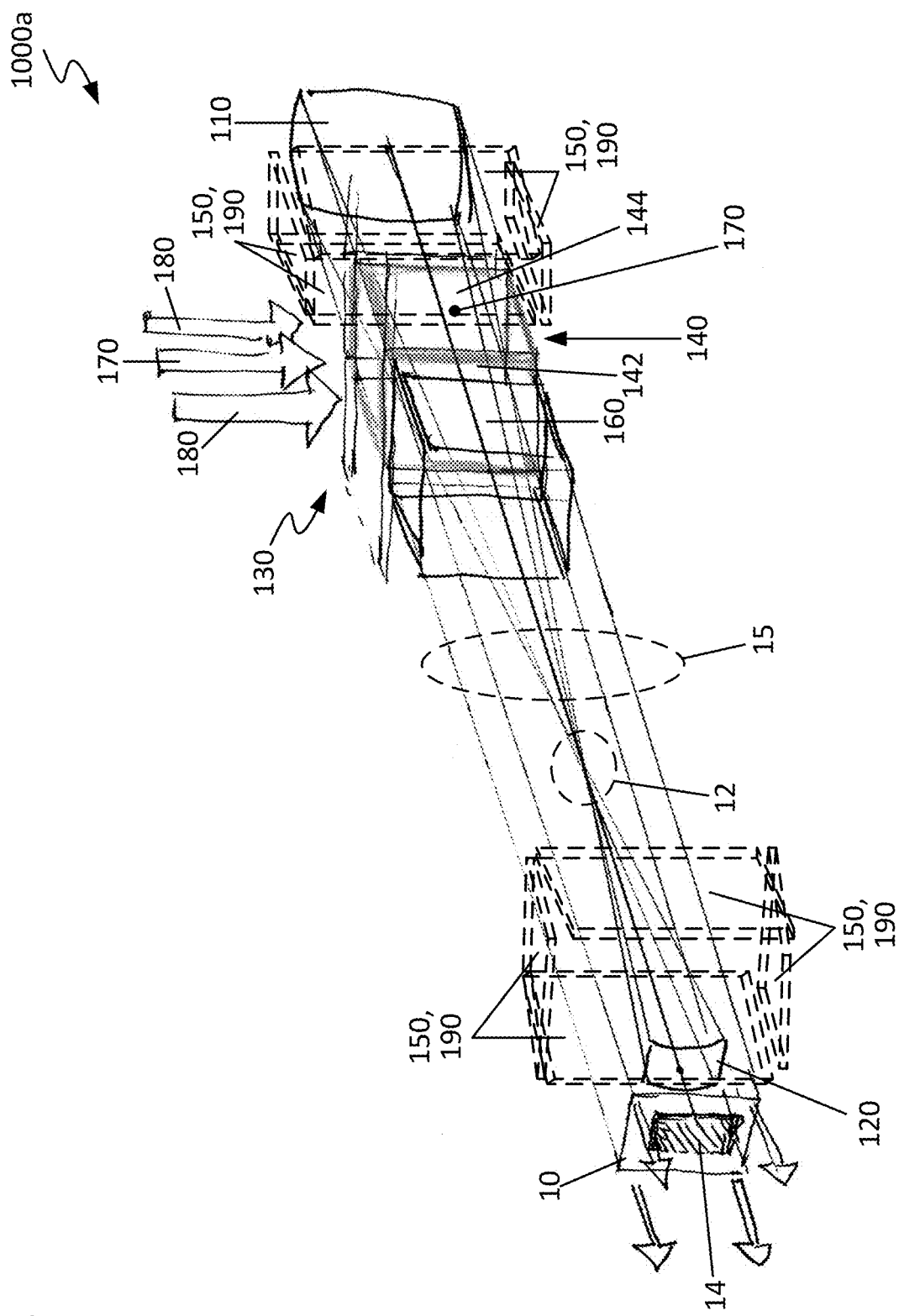
FIG. 2 illustrates a partial view of the system of FIG. 1, in accordance with an embodiment of the present disclosure.
Figure 3A:
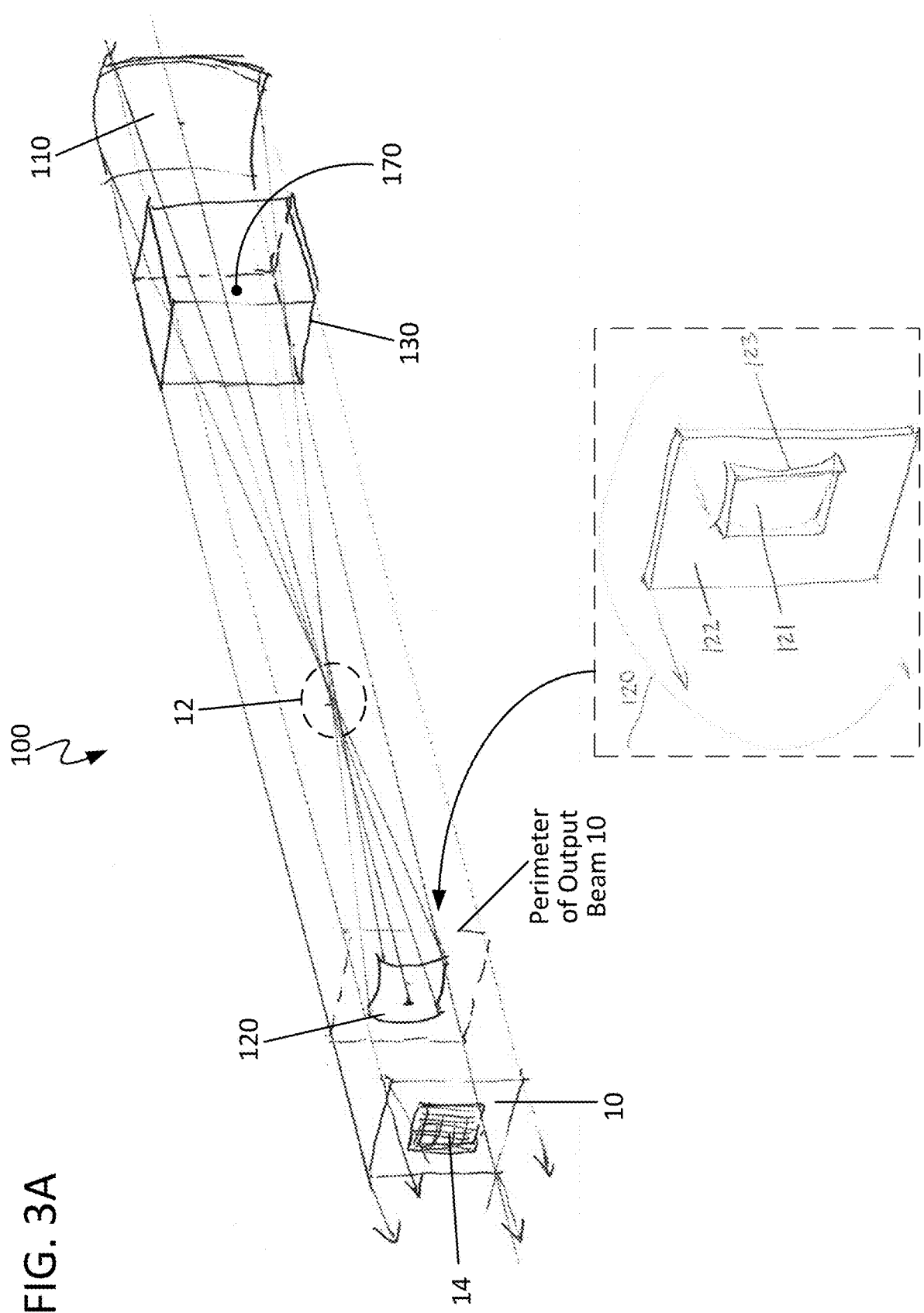
FIG. 3A illustrates another partial view of the unstable resonator of the system of FIG. 1, in accordance with an embodiment of the present disclosure.
Figure 3B:
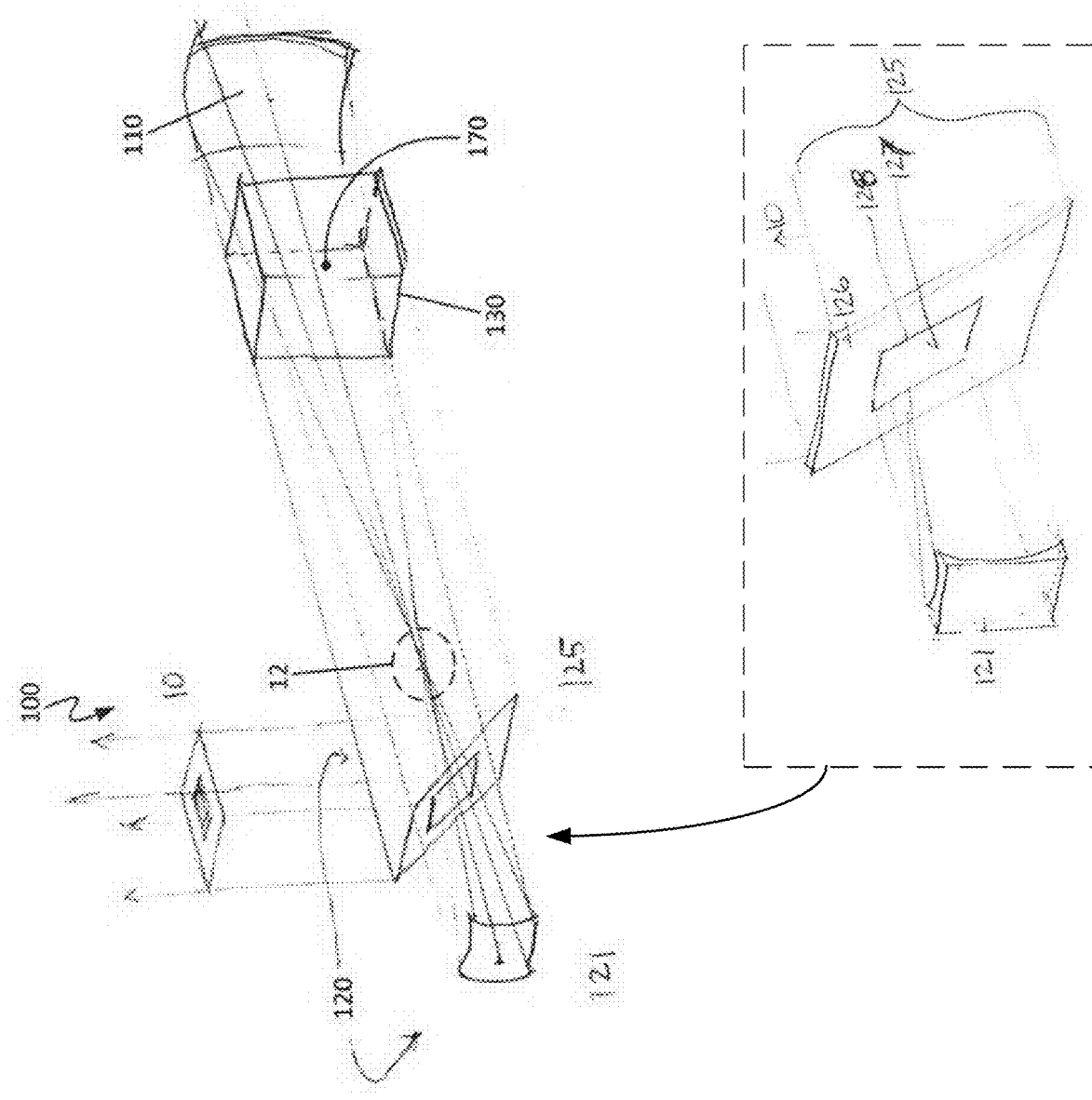
FIG. 3B illustrates a partial view of the unstable resonator of the system of FIG. 1, in accordance with another embodiment of the present disclosure.
Figure 3C:
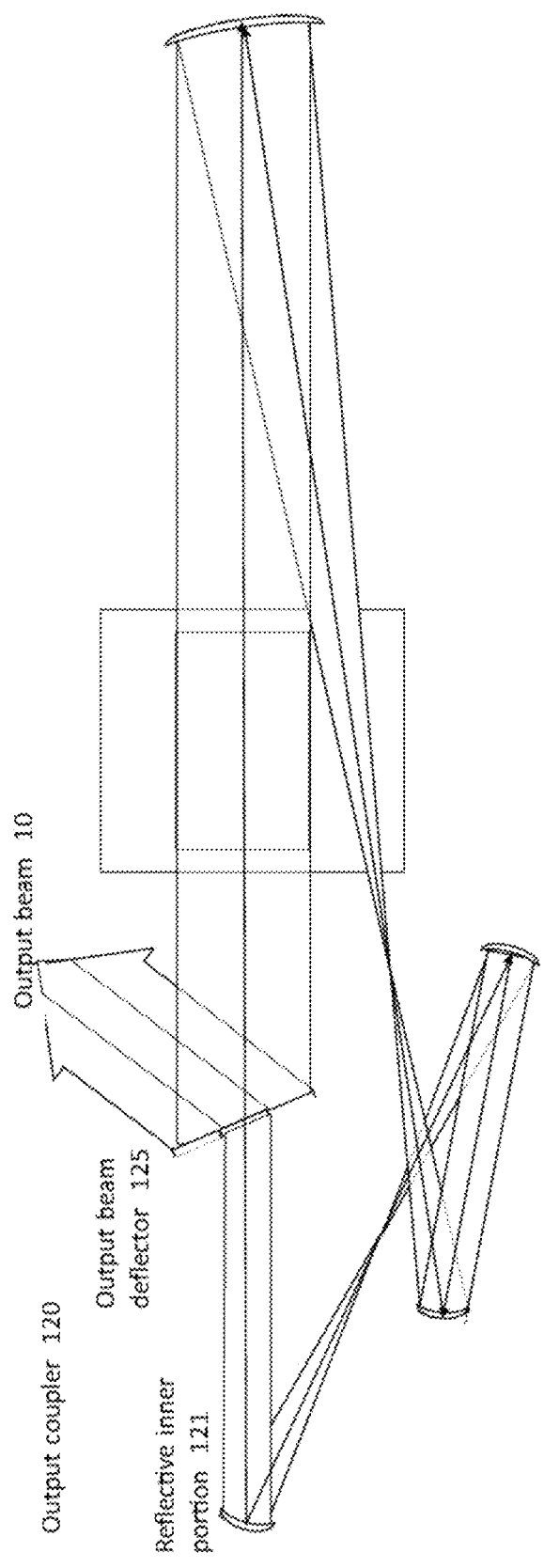
FIG. 3C is a schematic illustration of the unstable resonator of the system of FIG. 1, in accordance with another embodiment of the present disclosure.

As noted above, system 1000a may include an unstable resonator 100 and a lasing amplifier 130. FIG. 2 illustrates a partial view of system 1000a, in accordance with an embodiment of the present disclosure. FIG. 3A illustrates another partial view of the unstable resonator of the system of FIG. 1, in accordance with an embodiment of the present disclosure. FIG. 3B illustrates a partial view of the unstable resonator of the system of FIG. 1, in accordance with another embodiment of the present disclosure. FIG. 3C is a schematic illustration of the unstable resonator of the system of FIG. 1, in accordance with another embodiment of the present disclosure. In some embodiments, unstable resonator 100 may be configured, for example, as a confocal unstable resonator. In some cases, unstable resonator 100 may be configured as a negative branch confocal unstable resonator or a positive branch confocal unstable resonator. Other suitable configurations for unstable resonator 100 will depend on a given target application or end-use and will be apparent in light of this disclosure.

Regarding high-reflectivity mirror 110 (of unstable resonator 100), the geometry and dimensions, as well as the reflectivity, thereof may be customized, as desired for a given target application or end-use. In some cases, mirror 110 may have a substantially spherical or parabolic geometry. In some cases, mirror 110 may have a reflectivity, for example, in the range of about 95.0-99.9999% (e.g., about 95.0-97.0%, about 97.0-99.0%, about 99.0-99.9999%, about 99.95-99.9999%, or any other sub-range in the range of about 95.0-99.9999%). In at least some cases, mirror 110 may include and optionally extend beyond the illumination pattern provided by any reflective region of output coupler 120, multiplied by the magnification of unstable resonator 100. Other suitable configurations for high-reflectivity mirror 110 will depend on a given target application or end-use and will be apparent in light of this disclosure.

Regarding output coupler 120 (of unstable resonator 100), the geometry and dimensions, as well as the reflectivity, thereof also may be customized, as desired for a given target application or end-use. In some embodiments, output coupler 120 may include, for example, (1) an inner region including an output coupling mirror with at least some reflectivity and (2) an outer region (e.g., its perimeter) that maximizes transmission. In some such cases, the output coupling mirror (of output coupler 120) may have a substantially spherical or parabolic geometry. In some cases, the output coupling mirror (of output coupler 120) may have a reflectivity, for example, in the range of about 50.0-99.9999% (e.g., about 50.0-70.0%, about 70.0-90.0%, about 90.0-99.0%, about 99.0-99.9999%, or any other sub-range in the range of about 50.0-99.9999%). In some instances, it may be desirable to have a reflectivity that transitions smoothly from high reflectivity to high transmission. In some instances, it may be desirable to ensure that output coupler 120 has a well-defined edge. As will be appreciated in light of this disclosure, comparing (A) the full width at half maximum (FWHM) (i.e., the distance from one side to the other where the intensity drops to half of its central intensity) and (B) the full width at one-tenth maximum (FWTM) (i.e., which quantifies the distance between the two side where the intensity has dropped to one-tenth its central value) may provide a measure of the edge thickness. For a one-dimensional Gaussian distribution, the FWTM is 83% greater than the FWHM. For a distribution whose intensity distribution is made more uniform than a Gaussian and whose edges are better defined than that of a Gaussian, the FWTM is closer in value to the FWHM. Rather than the FWTM being 83% greater than the FWHM, it may be only 20% greater or even within 0.001-10.0% of the FWHM. The closer the FWTM distance is to the FWHM distance, the sharper the edge definition.

Figure 4A:
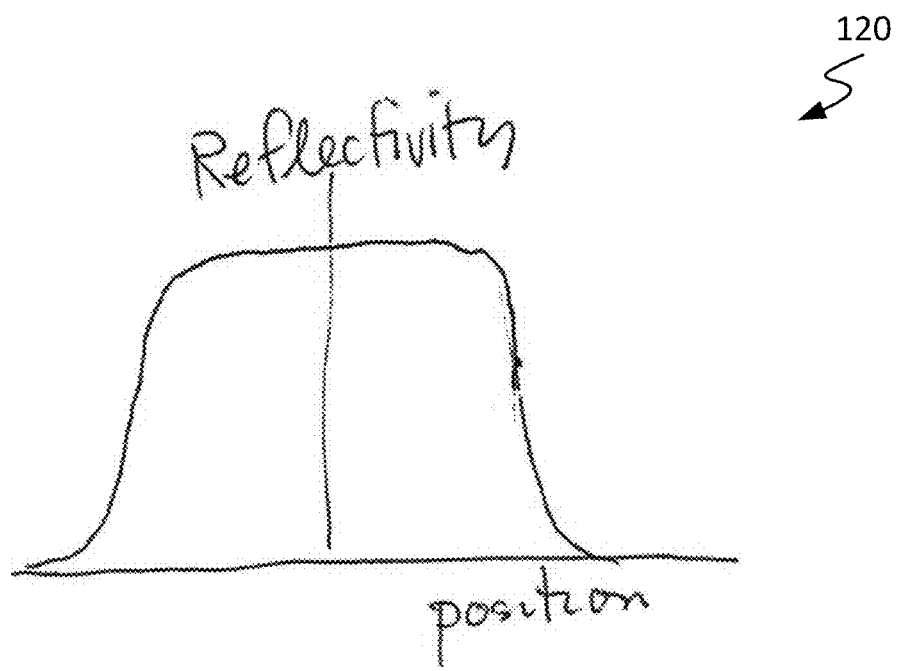
FIG. 4A is a graph illustrating reflectivity as a function of position for an output coupler configured with graded reflectivity, in accordance with an embodiment of the present disclosure.
Figure 4B:
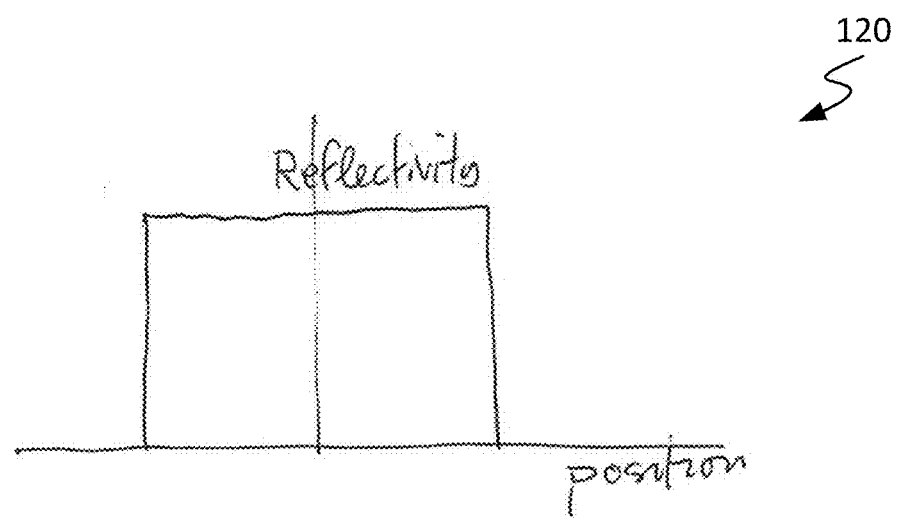
FIG. 4B is a graph illustrating reflectivity as a function of position for an output coupler configured with uniform reflectivity, in accordance with an embodiment of the present disclosure.

Further regarding the reflectivity of output coupler 120, FIG. 4A is a graph illustrating reflectivity as a function of position for an output coupler 120 configured with graded reflectivity, in accordance with an embodiment of the present disclosure, and FIG. 4B is a graph illustrating reflectivity as a function of position for an output coupler 120 configured with uniform reflectivity out to a well-defined edge, in accordance with an embodiment of the present disclosure. As will be appreciated in light of this disclosure, the example reflectivity profiles shown in FIGS. 4A-4B may be interpreted (A) as being across the diameter of an output coupler 120 configured as an axially symmetric mirror with a circular perimeter or (B) as a function of two orthogonal axes of an output coupler 120 with a rectangular or square perimeter. If output coupler 120 has a graded reflectivity, for example, then output beam 10 leaving mirror 110 and passing through flowing lasing gas 170 (discussed below) may have a generally diffuse edge, in accordance with some embodiments. If output coupler 120 instead has a uniform reflectivity out to a well-defined edge perimeter, for example, then output beam 10 leaving mirror 110 and passing through flowing lasing gas 170 still may have a diffuse edge, but only if the gain of flowing lasing gas 170 tapers to zero, in accordance with some embodiments. If, for example, output coupler 120 has a uniform reflectivity and flowing lasing gas 170 has uniform gain due to being pumped with pump beam(s) 152 having a distinct edge co-located at the edge of output beam 10, then output beam 10 leaving mirror 110 and passing through flowing lasing gas 170 may have a distinct edge surface, in accordance with some embodiments.

Further regarding the geometry of output coupler 120 with an edge perimeter, some embodiments may provide distinct one or more sub-elements configured to provide for separation of output beam 10 and reflective feedback and magnification of the inner portion, together making up output coupler 120. In some embodiments, output beam 10 may pass through a transmissive outer portion 122, while reflective feedback and magnification may be provided by a reflective inner portion 121. Transmissive outer portion 122 may be configured, in accordance with some embodiments, to provide mechanical support and positioning of reflective inner portion 121 (e.g., by adhesive or other sufficient mounting of reflective inner portion 121 to outer portion 122) that does not interfere with propagation of output beam 10. In at least some such embodiments, the illuminated perimeter of a reflective inner optical element 123, after magnification, may determine the edge surfaces of output beam 10 on the next pass. Alternatively (or additionally), an output beam deflecting element 125 with a reflective outer portion 126 and transmissive inner portion 127 and a boundary perimeter 128 between the two may be disposed before the beam impinges on reflective inner portion 121 of output coupler 120. As will be appreciated in light of this disclosure, such arrangement(s) may cause the outer portion of the beam which constitutes output beam 10 to be reflected away from the inner portion, and the inner portion of the beam may pass through a transmissive inner portion 127 of output beam deflecting element 125 to reflective inner portion 121 of output coupler 120 disposed downstream. In at least some such embodiments, boundary perimeter 128 between transmissive inner portion 127 of output beam deflecting element 125 and reflective outer portion 126 that deflects the beam, when magnified by unstable resonator 100, may form the edge surfaces in output beam 10.

Further regarding the orientation of output coupler 120, in some embodiments, output coupler 120 may have an optical axis that is aligned with high-reflectivity mirror 110 to form a linear unstable resonator 100, as depicted in FIGS. 3A and 3B. In some other embodiments, output coupler 120 may have its reflective inner portion 121 oriented at an angle so that the beam portion being returned to lasing amplifier 130 encounters one or more additional elements, tracing a path of reflections that constitutes a closed loop, as in FIG. 3C. Other suitable configurations for output coupler 120 will depend on a given target application or end-use and will be apparent in light of this disclosure.

In accordance with some embodiments, lasing amplifier 130 may include a window assembly 140 in which a flowing lasing gas 170 may be provided. Lasing amplifier 130 further may be configured, in accordance with some embodiments, to have one or more flowing gas curtains 180 flowing along interior surface(s) of window assembly 140. Each of these elements is discussed in turn below.

Figure 17:
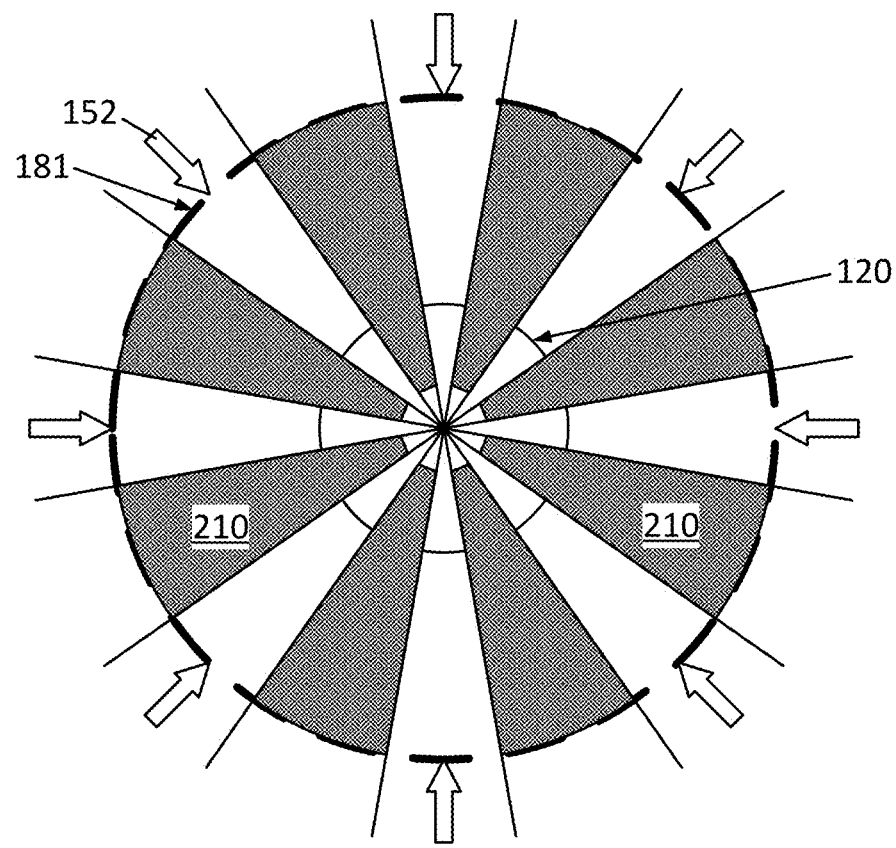
FIG. 17 illustrates a view along the output beamline of an arrangement of edge surfaces of a gaseous laser system, in accordance with another embodiment of the present disclosure.
Figure 18:
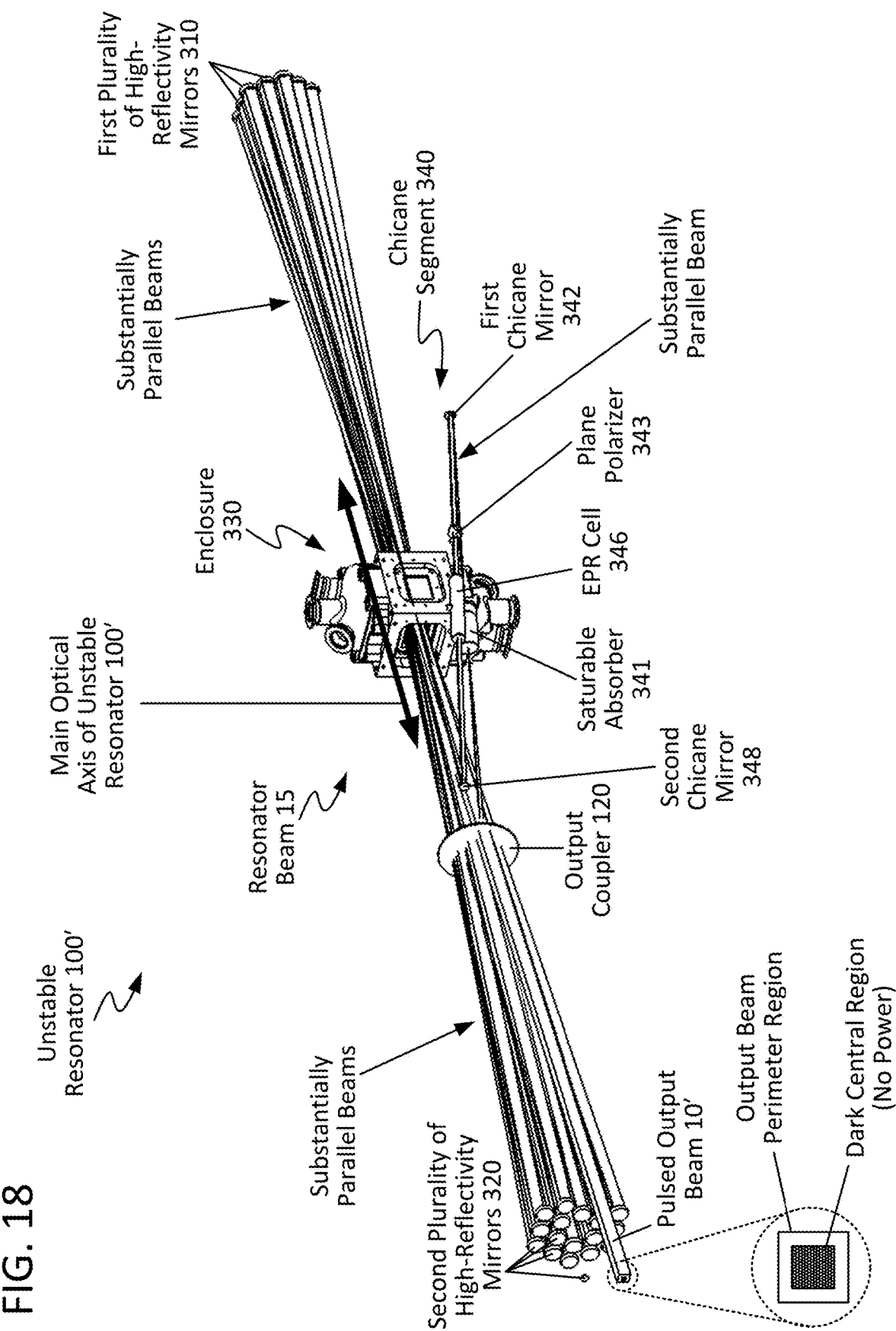
FIG. 18 illustrates an isometric view of an unstable resonator of a gaseous laser system configured in accordance with another embodiment of the present disclosure.
Figure 19:
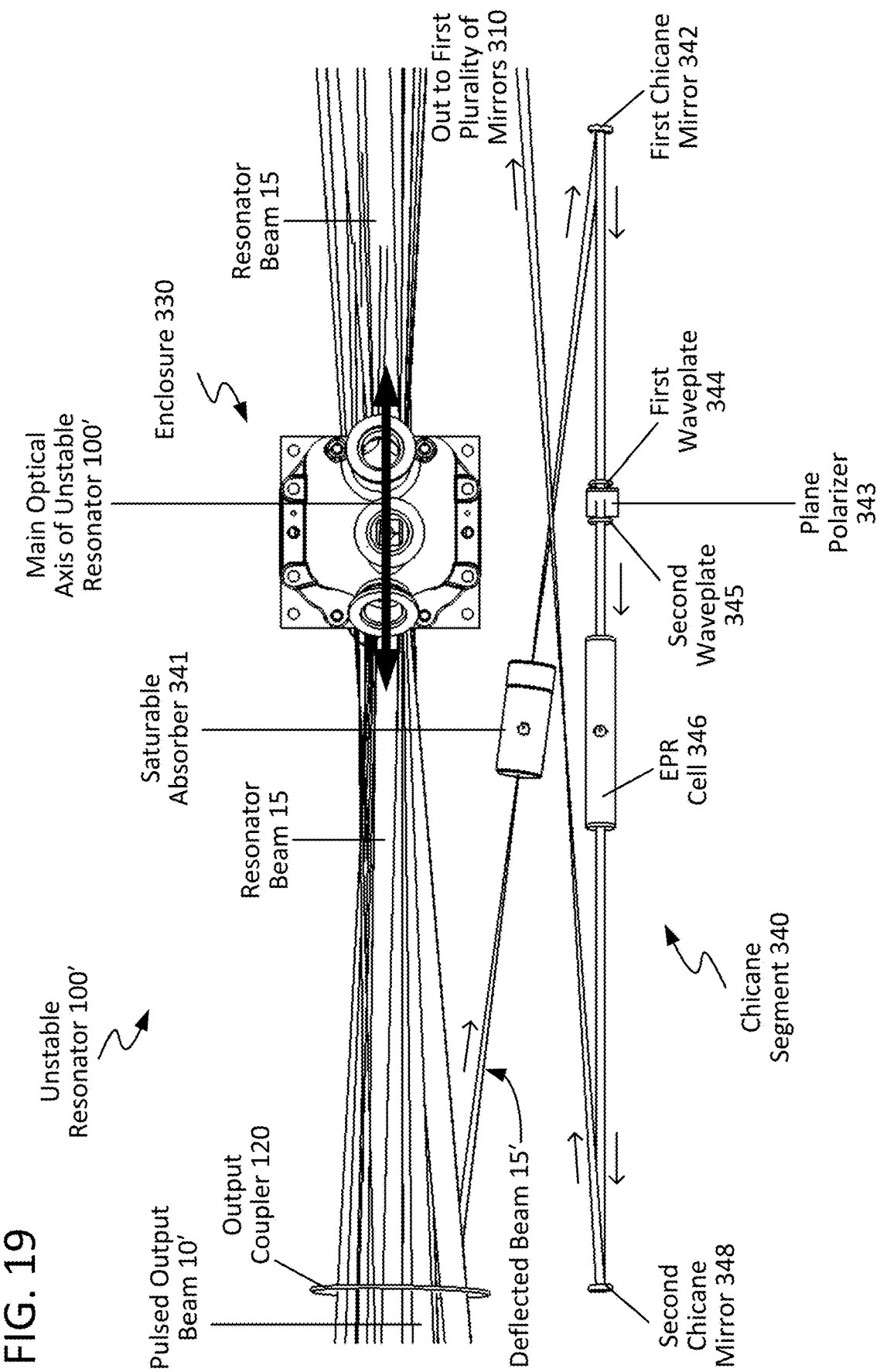
FIG. 19 illustrates a top-down plan view of the unstable resonator of FIG. 18.
Figure 20:
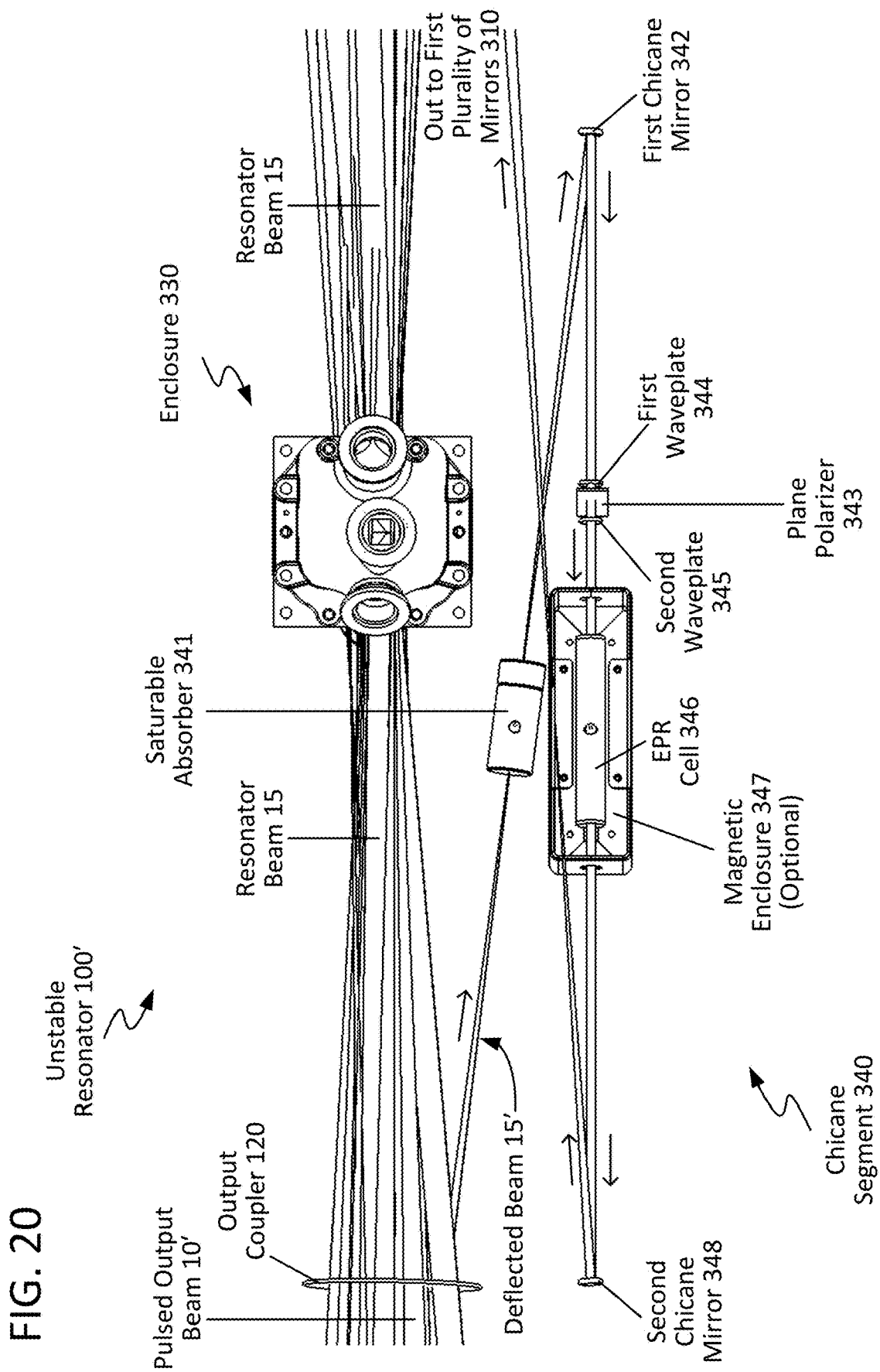
FIG. 20 illustrates a top-down plan view of the unstable resonator of FIG. 18 further including a magnetic enclosure for the EPR cell in accordance with another embodiment of the present disclosure.

Window assembly 140 may include one or more optical windows. The quantity and arrangement of optical windows, as well as the geometry and dimensions of each such optical window, may be customized, as desired for a given target application or end-use. As can be seen from FIG. 1, for example, window assembly 140 may include two optical windows-a forward end window 142 (generally closer to output coupler 120) and a rearward end window 144 (generally closer to mirror 110). It should be noted, however, that the present disclosure is not intended to be so limited, as window assembly 140 may include a lesser quantity (e.g., only one, such that mirror 110 is included within the volume of the flowing gases) or greater quantity (e.g., 3, 4, 5, 6, 7, 8, or more) of optical windows, in accordance with other embodiments. For example, as can be seen from FIG. 11 (discussed below), for example, window assembly 140 may include four optical windows-windows 142, 144 (discussed above), a first side window 146, and a second side window 148. FIG. 17 (discussed below), for example, depicts a window assembly 140 including ten optical windows (e.g., eight for pumping and two for resonator beam 15).

Additionally, the material composition, optical transmission characteristics, and refraction of a given optical window 142, 144, 146, 148 (or window assembly 140 more generally) may be customized, as desired for a given target application or end-use, and generally may depend on performance characteristics and requirements such as resilience to degradation, absorption of energy from pump beam 152 and output beam 10, and dimensional changes associated with energy absorption, among others. In some embodiments, a given optical window may be constructed from fused silica or sapphire, for example. In some embodiments, a given optical window may be (A) coated with one or more coating layers, such as a high-transmission coating or a high-reflectivity coating and/or (B) etched or embossed with a nanotextured surface. In accordance with some embodiments, one or more windows may be customized or contoured to provide (A) optical refraction, such as spherical or cylindrical lensing and/or (B) deflection (as through a prism), either of which may be segmented to various regions of the window or encompassing the whole window. Other suitable configurations for window assembly 140, in part or in whole, will depend on a given target application or end-use and will be apparent in light of this disclosure.

As previously noted, flowing lasing gas 170 may be provided in lasing amplifier 130. More specifically, a gaseous amplifier gain medium may be utilized as flowing lasing gas 170, in accordance with some embodiments. The chemical composition, pressure, and vapor concentration of flowing lasing gas 170 may be customized, as desired for a given target application or end-use. In accordance with some embodiments, flowing lasing gas 170 may be (or otherwise may include) any one (or combination) of helium-4, helium-3, a hydrocarbon, and a fluorocarbon, to name a few options. In accordance with some embodiments, flowing lasing gas 170 may be substantially free of complex molecules (e.g., such as hydrocarbons or fluorocarbons), relying on, for example, helium as a quenching agent. In accordance with some other embodiments, one or more complex molecules may be included as quenching agent(s). In at least some hydrocarbon-free cases, the gas pressure may be maintained, for example, in the range of about 300-20,000 torr (e.g., about 500-10,000 torr or any other sub-range in the range of about 300-20,000 torr). In at least some cases that incorporate a quenching agent, the gas pressure may be maintained, for example, in the range of about 50-1,500 torr (e.g., about 200-800 torr or any other sub-range in the range of about 50-1,500 torr). In accordance with some embodiments, flowing lasing gas 170 may include the vapor of one or more alkali metals, such as rubidium (Rb), cesium (Cs), and/or potassium (K), to name a few. In accordance with some embodiments, flowing lasing gas 170 may have an alkali metal vapor concentration in the range of about $5 \times 10^{11}$ to $5 \times 10^{14}$ atoms/cm$^3$ (e.g., about $5 \times 10^{11}$ to $5 \times 10^{12}$ atoms/cm$^3$, about $5 \times 10^{12}$ to $5 \times 10^{13}$ atoms/cm$^3$, about $5 \times 10^{13}$ to $5 \times 10^{14}$ atoms/cm$^3$, or any other sub-range in the range of about $5 \times 10^{11}$ to $5 \times 10^{14}$ atoms/cm$^3$). As will be appreciated in light of this disclosure, scenarios with lower gas pressure and/or higher output power generally may operate with lower alkali density, whereas others with higher pressure and/or lower output power (e.g., some cases involving helium as a quenching agent) may operate with higher alkali density, in accordance with some embodiments.

Additionally, the flow rate and flow direction of flowing lasing gas 170 may be customized, as desired for a given target application or end-use. In accordance with some embodiments, flowing lasing gas 170 may have a flow rate through window assembly 140 (or lasing amplifier 130 more generally) in the range of about 1-100 m/s (e.g., about 10-25 m/s, about 25-50 m/s, or any other sub-range in the range of about 1-100 m/s). Flowing lasing gas 170 may flow generally upward (e.g., generally against the direction of gravity), generally downward (e.g., generally in the direction of gravity), or transversely in any direction relative to gravity. Other suitable characteristics for flowing lasing gas 170 will depend on a given target application or end-use and will be apparent in light of this disclosure.

Also, as previously noted, one or more flowing gas curtains 180 may be provided along interior surface(s) of window assembly 140. For example, in accordance with some embodiments, a single flowing gas curtain 180 may be provided. In accordance with some other embodiments, an inner flowing gas curtain 180a and an outer flowing gas curtain 180b may be provided. A given flowing gas curtain 180 may include a flow of one or more gas(es) that do not include a substantial concentration of alkali vapor and may be provided over a given optical window through which (A) a given pump beam 152 and/or (B) output beam 10 passes in operation of system 1000a, in accordance with some embodiments.

The chemical composition and concentration of a given flowing gas curtain 180 may be customized, as desired for a given target application or end-use. In accordance with some embodiments, flowing gas curtain(s) 180a, 180b may be of the same composition and pressure as flowing lasing gas 170 but be substantially depleted of alkali vapor, such that flowing gas curtain(s) 180a, 180b may have a concentration of alkali vapor which is reduced by a factor in the range of about 3-500 (e.g., about 5-50, about 10-20, or any other sub-range in the range of about 3-500). Because there may be some mixing of gas(es) between the separate flow channels allowing some concentration to pass from the channel with flowing lasing gas 170 into the channel with the flowing gas curtain(s) 180a, 180b, one or more additional flowing gas curtains 180 optionally may be provided to achieve further reduction in the alkali concentration, in accordance with some embodiments.

Additionally, the flow velocity of a given flowing gas curtain 180 may be customized, as desired for a given target application or end-use. In accordance with some embodiments, a given flowing gas curtain 180 may have a flow velocity along a given window of window assembly 140 (or lasing amplifier 130 more generally) that approximates the velocity of flowing lasing gas 170. In some embodiments, a given flowing gas curtain 180 may have a velocity that differs from that of flowing lasing gas 170, for example, by flowing in generally the same direction at a speed that differs from that of flowing lasing gas 170 by about 0.1-30% (e.g., about 0.1-10%, about 10-30%, or any other sub-range in the range of about 0.1-30%). In some cases, the difference may be a reduction of the flow speed of flowing gas curtain 180 by about 10%, for instance, to minimize (or otherwise reduce) any eddy currents.

Also, the temperature of a given flowing gas curtain 180 may be customized, as desired for a given target application or end-use. In accordance with some embodiments, a given flowing gas curtain 180 may have a temperature that is less than the temperature of flowing lasing gas 170 by about 10-60° C. (e.g., about 10-20° C., about 20-30° C., about 30-60° C., or any other sub-range in the range of about 10-60° C.). By maintaining a lower temperature, the equilibrium concentration of alkali vapor in flowing gas curtain 180 may be reduced from that of flowing lasing gas 170. The temperature difference between flowing lasing gas 170 and an inner flowing gas curtain 180a, for example, may be limited because material surface(s) between the flow of flowing lasing gas 170 and any inner flowing gas curtain 180a may reach an equilibrium temperature that is below the condensation temperature of the alkali in flowing lasing gas 170, thereby altering the properties of flowing lasing gas 170. Adding a second, outer flowing gas curtain 180b may relax this concern, as outer flowing gas curtain 180b may be maintained at a temperature that is much lower than either that of flowing lasing gas 170 or inner flowing gas curtain 180a, substantially reducing the alkali concentration adjacent to a given window without altering the properties of flowing lasing gas 170. Other suitable characteristics for flowing gas curtain(s) 180 will depend on a given target application or end-use and will be apparent in light of this disclosure.

The overall configuration of lasing amplifier 130 and arrangement of flowing gas curtain(s) 180 and flowing lasing gas 170 with respect to window assembly 140 may be customized, as desired for a given target application or end-use. In so doing, the bounds of flowing lasing gas 170 and flowing gas curtain(s) 180 may be defined, at least in part. For example, consider FIG. 5, which illustrates a partial view of system 1000a of FIG. 1, in accordance with an embodiment of the present disclosure. As can be seen here, forward end window 142 and rearward end window 144 may be of substantially rectangular (e.g., square) geometry and arranged substantially parallel to one another. Flowing lasing gas 170 may flow through lasing amplifier 130 between windows 142, 144. A flowing gas curtain 180 may be provided between the flow of flowing lasing gas 170 and forward end window 142. Similarly, a flowing gas curtain 180 may be provided between the flow of flowing lasing gas 170 and rearward end window 144. In at least some cases including both an inner flowing gas curtain 180a and an outer flowing gas curtain 180b, inner flowing gas curtain 180a may flow between the flow of flowing lasing gas 170 and outer flowing gas curtain 180b, while outer flowing gas curtain 180b may flow between inner flowing gas curtain 180a and the adjacent window surface. In the example configuration of FIG. 5, window assembly 140, flowing gas curtains 180 (e.g., inner flowing gas curtain 180a and outer flowing gas curtain 180b), and the lasing volume of flowing lasing gas 170 may exhibit a generally cubic shape. It should be noted, however, that the present disclosure is not intended to be so limited, as in a more general sense, and in accordance with some other embodiments, a rectangular box shape or other parallelepiped shape may be provided.

In some other embodiments, forward end window 142 and rearward end window 144 may be of substantially octagonal geometry and arranged substantially parallel to one another. Flowing lasing gas 170 may flow through lasing amplifier 130 between windows 142, 144. A flowing gas curtain 180 may be provided over the interior of forward end window 142 and rearward end window 144. In these example embodiments, window assembly 140, flowing gas curtain(s) 180, and the lasing volume of flowing lasing gas 170 may exhibit a generally right octagonal prism shape. It should be noted, however, that the present disclosure is not intended to be so limited, as in a more general sense, and in accordance with some other embodiments, a right hexagonal prism shape, a right decahedral prism shape, or other polyhedral prism shape may be provided. Note that, for unstable resonators 100 with negative magnification, the illumination pattern is inverted with each pass, so that the goal of providing edge surfaces that are congruent for pump beam (s) 152 and output beam(s) 10 may be achieved with a prism shape, for example, only if it has an even number of sides. For unstable resonators 100 with positive magnification, the shape may not be so limited.

In some other embodiments, forward end window 142 and rearward end window 144 may be of substantially circular geometry and arranged substantially parallel to one another. Flowing lasing gas 170 may flow through lasing amplifier 130 between windows 142, 144. A flowing gas curtain 180 may be provided between flowing lasing gas 170 and the interior surface of forward end window 142 and/or rearward end window 144. In these example embodiments, window assembly 140, flowing gas curtain(s) 180, and the lasing volume of flowing lasing gas 170 may exhibit a generally right circular cylinder shape. It should be noted, however, that the present disclosure is not intended to be so limited, as in a more general sense, and in accordance with some other embodiments, a right elliptical prism shape or other closed-curve prism shape may be provided.

As previously noted, system 1000a may include one or more pump beam sources 150 configured to provide optical pumping for system 1000a by delivering one or more pump beams 152 to flowing lasing gas 170 in lasing amplifier 130. In accordance with some embodiments, a given pump beam source 150 may be configured to provide pump light which is highly collimated along one axis (e.g., the fast axis) but divergent along another axis (e.g., the slow axis). As will be appreciated in light of this disclosure, the optical pumping wavelength(s) and spectral linewidth(s), as well as the beam geometry, of the pump light may be customized, as desired for a given target application or end-use. As will be further appreciated, in some cases, the pump beam 152 intensity emanating from a given pump beam source 150, on its own, may not be sufficient for optimally pumping system 1000a. Thus, in accordance with some embodiments, a given pump beam 152 from multiple pump beam sources 150 may be merged with (e.g., aligned along an adjacent trajectory) or overlapped with one another.

Figure 6:
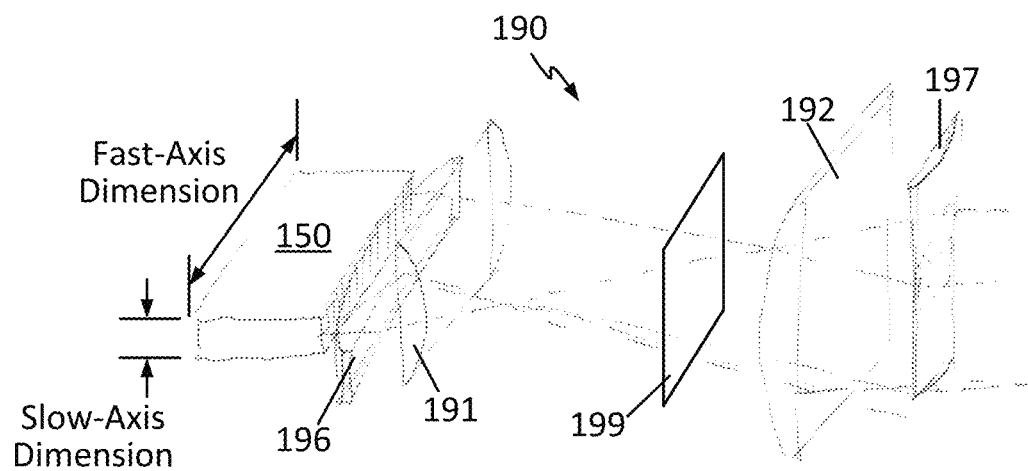
FIG. 6 illustrates an example arrangement of pump beam source(s) and beam-shaping optic(s), in accordance with an embodiment of the present disclosure.

The overall three-dimensional profile of pump beam 152, as well as its average intensity, spatial illumination pattern, and divergences, may be customized by placement of pump source 150 components together with one or more beam-shaping optics 190 (e.g., refractive and/or reflective elements) along the optical path that modify the envelope of pump beam 152 as it propagates from pump source 150 to the region of flowing lasing gas 170. For example, consider FIG. 6, which illustrates an example arrangement of pump beam source(s) 150 and beam-shaping optics 190, in accordance with an embodiment of the present disclosure. Beam-shaping optics 190 may be configured, in accordance with some embodiments, to customize the profile of pump beam (s) 152 impinging on flowing lasing gas 170. As can be seen, pump beam source 150 may include a stack of laser diode array bars with a slow-axis dimension and a fast-axis dimension. Due to the large divergence of pump beam 152 in the slow-axis direction, beam-shaping optics 190 (e.g., such as cylindrical lenses 191, 192, 196, 197 and/or curved mirrors) configured, in accordance with some embodiments, to magnify pump beam 152 along the slow-axis dimension may provide a divergence reduction, resulting in slow-axis divergence that more closely matches that of the fast axis, allowing greater collimation as pump beam 152 propagates a greater depth through flowing lasing gas 170. Due to the low divergence of the fast axis, beam-shaping optic(s) (e.g., such as cylindrical lenses 191, 192, 196, 197 and/or curved mirrors) that serve to de-magnify (e.g., concentrate) pump beam 152 along this direction generally may provide a divergence that more closely matches that of the slow axis. As will be appreciated in light of this disclosure, although this constitutes an increase in the fast-axis divergence, it generally will not become the limiting factor in the goal of aligning with or defining amplifier surfaces that are shared with output beam(s) 10.

For some embodiments, a striped illumination pattern (attributable to the alternation of diode array sources and dark regions due to their heatsinks) may be present in flowing lasing gas 170. To eliminate (or otherwise reduce) this non-uniformity, a diffuser 199 may be added to the optical arrangement to address (e.g., smear out) these variations, in accordance with some embodiments. In some cases, diffuser 199 may be, for example, a small-angled, engineered diffuser.

For some embodiments, achieving a three-dimensional profile whose largest divergence (e.g., that of the slow axis) is minimized may be aided by incorporating a pump beam source 150 that has a large mismatch in its height-to-width ratio (e.g., with its large dimension along the fast axis (many bars aligned in one or more stacks) and its small dimension along the slow axis (few bars or a single bar in width). In some embodiments, the physical size of pump beam source 150 along the fast-axis direction may exceed the width of pump beam source 150 along the slow-axis direction, for instance, by a factor in the range of two to twenty.

Figure 7:
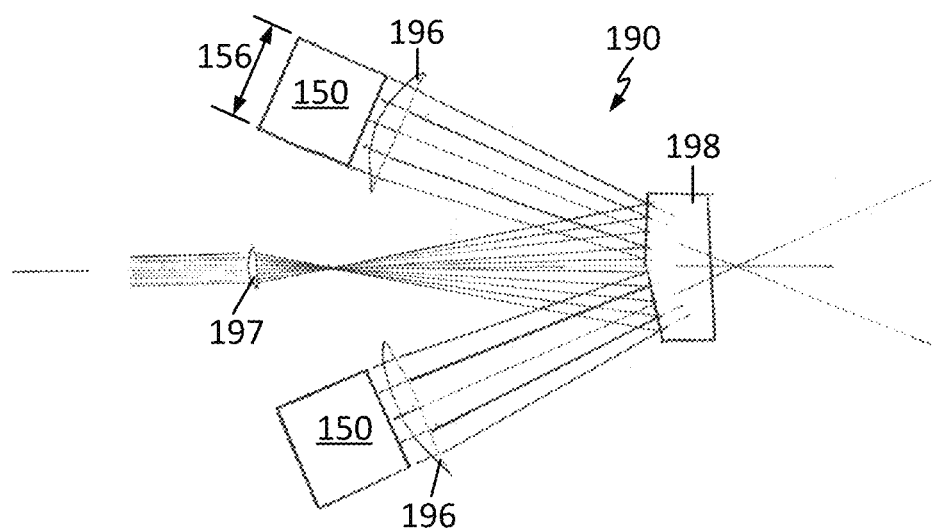
FIG. 7 illustrates an example arrangement of pump beam source(s) and beam-combining optic(s), in accordance with an embodiment of the present disclosure.

In some cases, the competing desires for de-magnifying (e.g., concentrating) the illumination along the fast axis while still filling the desired illumination pattern may require a pump beam source 150 whose size along the fast-axis direction (e.g., the number of bars in the stack) exceeds recommended limits in the manufacturing process, exceeds space available along a single direction in system 1000a, or causes optical elements to become large. Thus, and in accordance with some embodiments, one or more beam-combining elements may be employed. For instance, consider FIG. 7, which illustrates an example arrangement of pump beam source(s) 150 and beam-combining optic(s) 198, in accordance with an embodiment of the present disclosure. In some such cases, pump beam source 150 may be segmented into a quantity of contributing pump beam source 150 elements, each with its angled facet on beam-combining optic(s) 198, so that the desired but unattainable height is equal to the sum of the stack heights. In some embodiments, each pump beam source 150 may have its own transport optics and its own region of flowing lasing gas 170 to which its pump beam 152 illumination is dedicated. In some such embodiments, pump beams 152 may be formed separately but directed along an appropriate path so that the illuminated region from one contribution is made to be adjacent to that of a neighboring contribution. As will be apparent in light of this disclosure, the quantity of pump beam sources 150 that may be combined by beam-combining optic(s) 198 may be customized, as desired for a given target application or end-use. For instance, in some cases, two to fifty (or more) may be so combined.

In some cases, the length of the optical transport path may exceed the desired dimension, due to one or more factors (e.g., the optical arrangement required for magnifying the slow axis, for de-magnifying in the fast axis, for minimizing the angle of incidence into a longitudinally pumped amplifier, etc.). In such cases, the optical path may be folded by reflecting the path using a turning mirror, in accordance with some embodiments. In some instances, it may be desirable to have a portion of pump beam 152 encounter some optical element(s) while another portion thereof encounters different optical element(s). In some instances, one portion of pump beam 152 may be folded in a manner that differs from another portion. In some instances, there may be pump beam sources 150 emanating from different path(s) that are then used in combination to illuminate a region of flowing lasing gas 170. In these cases, pump beams 152 may be combined, for example, on a multifaceted mirror assembly, in accordance with some embodiments.

In some embodiments, pump beam 152 may illuminate flowing lasing gas 170 longitudinally (e.g., through one or more windows that are also shared by output beam 10). For such embodiments, it may be desirable to illuminate flowing lasing gas 170 via one or more pump beams 152 oriented at an angle relative to output beam 10. If this angle can be chosen to be small and the divergence can be minimized, then the depth of the illuminated region of flowing lasing gas 170 can be greater. Furthermore, if the angle between the optical axis of pump beam 152 and output beam 10 is also chosen to lie along the slow axis of pump beam 152, then the depth of the illuminated region of flowing lasing gas 170 will be determined by the greater of these, and the fast axis of the pump array can be used to delineate a boundary that is shared by pump beam 152 and output beam 10. In some embodiments, the surface of the region of flowing lasing gas 170 defined by the edge of fast-axis illumination is substantially perpendicular to the flow of flowing lasing gas 170, at the inlet of flowing lasing gas 170 into the amplifier region, and at the exit of flowing lasing gas 170 leaving the amplifier region. Then, assuming a rectilinear amplifier region, the edge of the illuminated region of flowing lasing gas 170 along the slow axis will follow flow streamlines.

Figure 8:
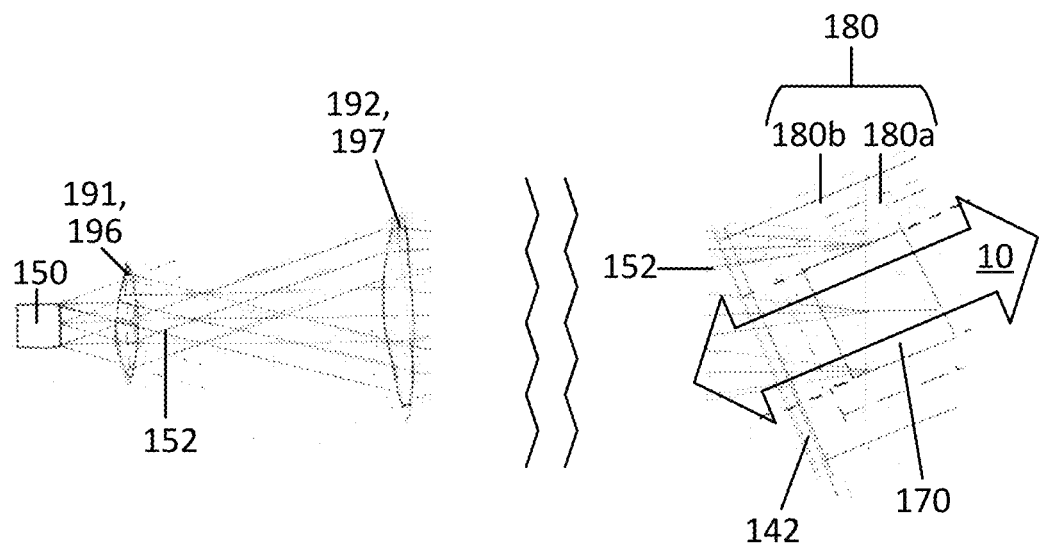
FIG. 8 illustrates an example longitudinal pumping arrangement, in accordance with an embodiment of the present disclosure.

In some embodiments, the angle of pump beam 152 entering flowing lasing gas 170 along the slow axis, together with the divergence along the slow axis, may be insufficient to provide a well-defined edge surface throughout the amplifier volume. In these instances, the parameters of the slow-axis afocal telescope may be chosen to maximize the overlap between the volume of flowing lasing gas 170 illuminated by pump beam 152 and that illuminated by output beam 10. This may be accomplished, for example, by selecting a width of pump beam 152 at the focus and a depth into flowing lasing gas 170 where that focus is positioned. Furthermore, to maximize the illumination at some depth into flowing lasing gas 170 of an off-axis pump beam 152 with a significant divergence, it may be useful to introduce a flowing side curtain to allow pump beam 152 transport to the region of flowing lasing gas 170 without exciting portions of flowing lasing gas 170 that are not illuminated by output beam 10. For example, consider FIG. 8, which illustrates an example longitudinal pumping arrangement, in accordance with an embodiment of the present disclosure. As can be seen here, pump beam source(s) 150 may impinge at an angle to illuminate flowing lasing gas 170. In some cases, as in FIG. 8, the focus of the slow-axis afocal telescope may lie at a depth roughly halfway within the amplifier volume, with a width chosen as the width of output beam 10 (which then becomes the width of the amplifier). Tracing the angled rays of pump beam 152 back to the entrance window(s) 142 and/or 144, it can be appreciated that some rays may pass through a side region of flowing gas curtain 180, entering flowing lasing gas 170 through the side rather than the front. These rays may contribute to forming a slow-axis focus at some depth within the amplifier volume of flowing lasing gas 170.

As will be appreciated in light of this disclosure, the illumination uniformity may be compromised in off-axis longitudinal pumping, most notably that two corners at the edge of pump beam 152 (or beyond its coverage) may have lower illumination intensity (or none at all). In some embodiments, flowing lasing gas 170 may be pumped from more than one side (e.g., two sides) of output beam 10 along the slow-axis direction, such that illumination from multiple pump beams 152 emanating from these multiple sides may share the same edge at the input of flowing lasing gas 170 and at the exit of flowing lasing gas 170 defined by the edge of the fast-axis illumination. In some embodiments, flowing lasing gas 170 may be pumped from multiple sides (e.g., four sides) of output beam 10, such that illumination from multiple pump beams 152 emanating from two of these multiple sides may share the same edge at the input of flowing lasing gas 170 and at the exit of flowing lasing gas 170 defined by the edge of the fast-axis illumination, and the other pump beams 152 may illuminate the active region up to that edge, as near as possible with the illumination along the direction of the slow-axis divergence. In some embodiments, flowing lasing gas 170 may be pumped along paths emanating from these multiple sides of output beam 10 through window 142 covering the amplifier end closest to output coupler 120. In some embodiments, flowing lasing gas 170 may be pumped along paths whose central axis is angled with respect to output beam 10 from multiple sides of output beam 10 through window 144 covering the amplifier end closest to high-reflectivity mirror 110.

Figure 9:
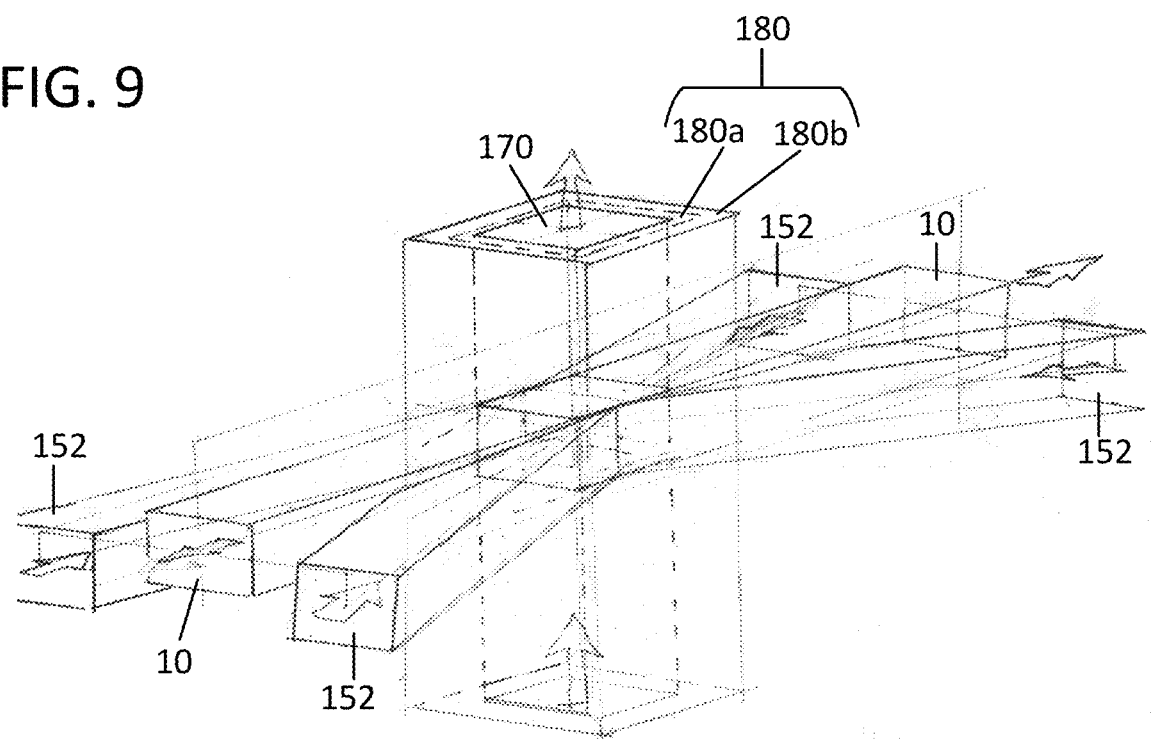
FIG. 9 illustrates an example longitudinal pumping arrangement, in accordance with an embodiment of the present disclosure.

In some embodiments, flowing lasing gas 170 may be pumped through both end window 142 (closest to output coupler 120) and end window 144 (closest to high-reflectivity mirror 110). As will be appreciated in light of this disclosure, it may be desirable to avoid alignment of two powerful pump beams sources 150 pointed directly at one another. In such cases, a perfect alignment of the fast-axis light from the two ends that define common edge surfaces that are shared by pump beam 152 and output beam 10 may cause the optical axes of the two opposing pump beams 152 to be shared, such that any pump light transmitted through flowing lasing gas 170 originating on one side may propagate into the laser on the other side. For these instances, an alternate alignment that provides for a small angle, for example, in the range of about 1-5° (e.g., about 2-4° or any other sub-range in the range of about) 1-5° between the optical plane of the fast-axis light entering from one end and the fast-axis light entering from the opposite end optionally may be employed, in accordance with some embodiments. For example, consider FIG. 9, which illustrates an example longitudinal pumping arrangement, in accordance with an embodiment of the present disclosure. As can be seen, this arrangement includes four pump beam sources 150 contributing to longitudinal pumping of a flowing lasing gas 170 with flowing gas curtain(s) 180 at both ends and on both sides, in accordance with some embodiments. After passing through flowing lasing gas 170, each of these transmitted beams 152 may follow a different optical path that is distinct from the incoming beam 152. It, therefore, can be made to propagate through the final fast-axis focusing element on the opposing side and arrive at the fast-axis focal plane, albeit at a different location in that focal plane due to the different angle in the flowing lasing gas 170. Where the transmitted beam 152 comes to a focus at a unique region of the focal plane in the opposing laser's optical path, it optionally may be deflected along a unique path for purposes of characterization, quantification, and/or absorption. In some such cases, the edge surface may become more complex, requiring additional care in assuring that unstable resonator 100 illuminates all pumped regions with output beam 10.

As previously noted, system 1000a also may include one or more pump beam edge-defining elements 160. Pump beam edge-defining element(s) 160 may be configured, in accordance with some embodiments, to help create (e.g., define and/or refine) a stronger edge for incident pump beam 152 light. In accordance with some embodiments, pump beam edge-defining element(s) 160 may include one or more mirrors, one or more optical elements, and/or one or more light-absorbing masks.

In some cases, the divergence of the slow axis may cause an illumination pattern which decreases with distance away from the fully illuminated region, such that the illumination intensity transitions past a level that may not be optimal for creating gain in this region of flowing lasing gas 170. In those instances, the design of the illumination pattern may face a choice of alternatives. That is, if the illumination pattern of unstable resonator 100 is chosen to not include the region that is insufficiently pumped, then that region may contribute to spontaneous emission near the edge of flowing lasing gas 170, causing inefficiencies in the adequately pumped regions due to amplified spontaneous emission (ASE). If instead the illumination pattern of unstable resonator 100 does include the region that is insufficiently pumped, then that illumination from the magnified pump beam 152 in unstable resonator 100 may not be optimally used. Thus, where pump beam 152 light can be deflected and employed for useful gain, one or more mirrors may be placed to define the edge of the illumination pattern at the location where pump beam 152 enters flowing lasing gas 170 to make a defining cut in the tail of the slow-axis light, deflecting rays impinging toward the low-illumination region back into the high-intensity region, in accordance with some embodiments. In some cases where slow-axis illumination extending outside the adequately illuminated region cannot be deflected and usefully used for gain, it may be simply absorbed on one or more light-absorbing masks outside the flowing lasing gas 170 region, so that its power does not contribute to internal heating and inefficiencies, in accordance with some embodiments. In either of these example scenarios, the definition of the pump beam 152 edge(s) may be improved, as the width of the edge in the amplifier region then will be defined by the width of the slow-axis divergence projected the distance into flowing lasing gas 170, growing by the product of the divergence times the distance as it propagates more deeply into flowing lasing gas 170, in accordance with some embodiments.

The quantity and arrangement of mirrors, optical elements, and/or masks of pump beam edge-defining element(s) 160 may be customized, as desired for a given target application or end-use. In some embodiments, pump beam edge-defining element(s) 160 may include two mirrors arranged to define two edges of the slow-axis illumination provided by pump beam 152. In some embodiments, pump beam edge-defining element(s) 160 may include four mirrors arranged in a box-like shape to define four edges of the illumination provided by pump beam 152. It should be noted, however, that the present disclosure is not intended to be so limited, as in accordance with other embodiments, pump beam edge-defining element(s) 160 may include fewer (e.g., 1, 2, or 3) or more (e.g., 5, 6, 7, 8, or more) mirrors, optical elements, and/or light-absorbing masks, as desired.

In accordance with some embodiments, pump beam edge-defining element(s) 160 may include a mirror assembly disposed near an intersection of pump beam 152 and the optical pathway of unstable resonator 100 and configured to have pump beam 152 incident therewith. In some cases, the mirror assembly may be configured to reflect at least a portion of pump beam 152 so as to define the edge of pump light incident therewith.

In accordance with some embodiments, pump beam edge-defining element(s) 160 may include an assembly of optical elements (e.g., lenses, mirrors, etc.) disposed outside of the optical pathway of unstable resonator 100 and configured to have pump beam 152 pass therethrough. In some instances, the assembly of optical elements may be configured to refractively optically transport and/or reflectively optically transport at least a portion of pump beam 152 so as to define the edge of pump light incident therewith. In some cases, the assembly of optical elements may be configured to form an image of at least a portion of pump beam 152 so as to define the edge of pump light incident therewith.

In accordance with some embodiments, pump beam 152 may enter the region of flowing lasing gas 170 axially, along the same optical path as output beam 10, by being deflected into flowing lasing gas 170 by an element that is transparent to output beam 10. In some cases, that element may reflect pump beam 152 and transmit output beam 10 due to a difference in (A) the direction of their linear polarization and/or (B) wavelength. By these and other methods, pump beam 152 and output beam 10 may achieve greater alignment for the goal of sharing edge surfaces that define the boundaries of the amplifier volume, in accordance with some embodiments.

As previously noted, system 1000a may be configured, in accordance with some embodiments, for longitudinal pumping of flowing lasing gas 170 in lasing amplifier 130. In such cases, pump beam(s) 152 may enter pump beam edge-defining element(s) 160, being incident with one or more constituent mirrors, optical elements, and/or masks thereof, and subsequently enter lasing amplifier 130 through forward end window 142 (of window assembly 140) for delivery to flowing lasing gas 170 (in lasing amplifier 130). Output beam 10 may enter/exit lasing amplifier 130 through forward end window 142 and rearward end window 144 (of window assembly 140). Output beam 10 may have an intermediate focus point 12. The portion of output beam 10 passing beyond the outer bounds of output coupler 120 may be utilized downstream of system 1000a. Also, downstream of output coupler 120, output beam 10 may include an interior dark region 14 resulting from upstream masking by output coupler 120.

As will be appreciated in light of this disclosure, an arrangement of pump beam sources 150, pump beam optical transport elements and apertures (e.g., beam-shaping optics 190, pump beam edge-defining elements 160), and flowing gas curtains 180 that provides definition of the edges of the amplifier region, together with the configuration of an unstable resonator 100 (e.g., a confocal unstable resonator) that produces an output beam 10 with the same edge surfaces, may allow for amplifier regions with a greater dimensional aspect ratio (e.g., the ratio of the length along output beam 10 to the transverse size). In some cases, the length may be substantially equal to the transverse dimension (e.g., an aspect ratio of unity). In some other cases, the aspect ratio may exceed unity, in some instances significantly.

Transversely Pumped System Architecture and Operation

Figure 10:
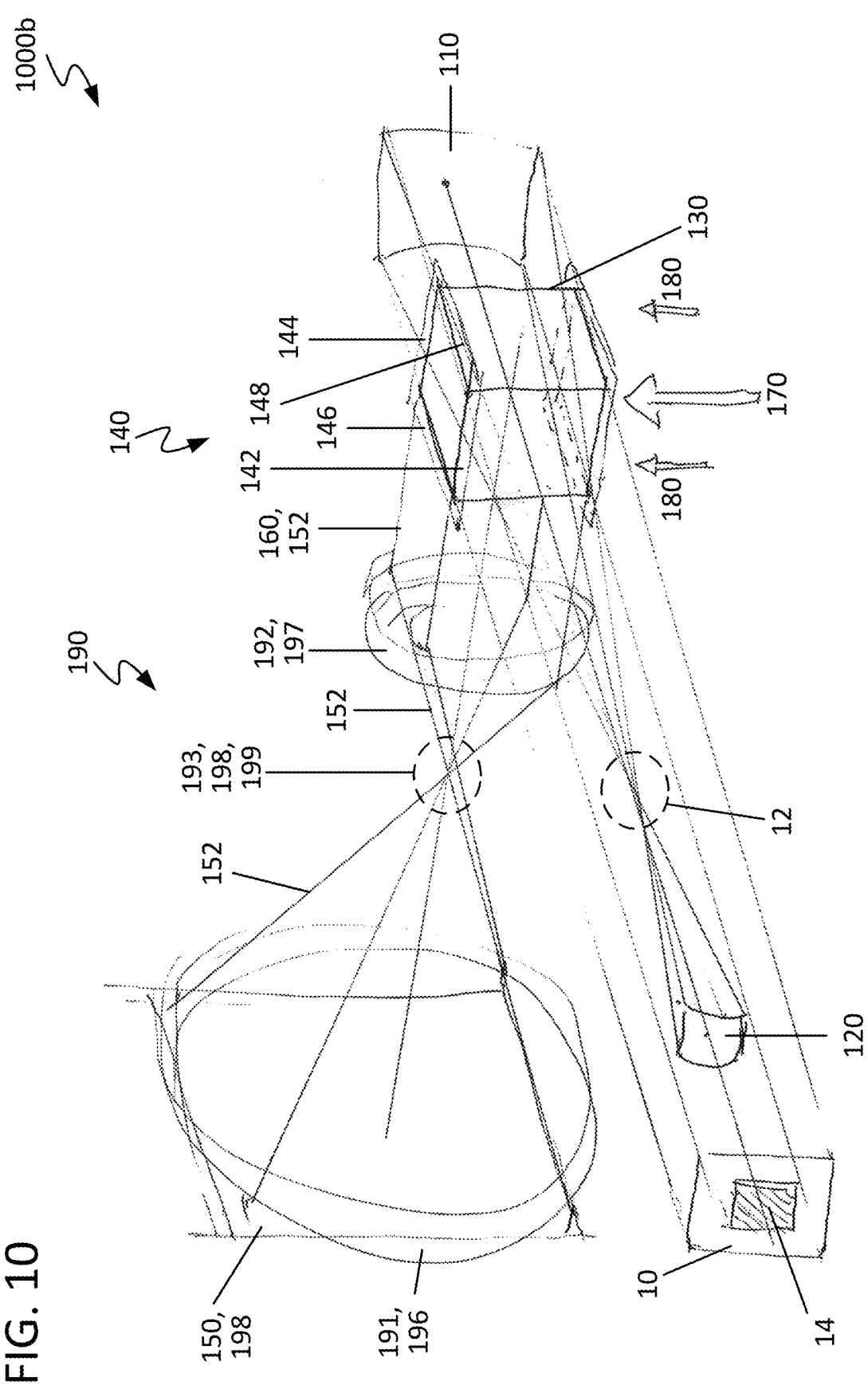
FIG. 10 illustrates a gaseous laser system configured for transverse pumping, in accordance with an embodiment of the present disclosure.

FIG. 10 illustrates a gaseous laser system 1000b configured for transverse pumping in accordance with another embodiment of the present disclosure. As can be seen, system 1000b may be configured much like system 1000a discussed above. As will be appreciated in light of this disclosure, the description provided above with respect to the various constituent elements and characteristics of system 1000a—for instance, unstable resonator 100, lasing amplifier 130, flowing lasing gas 170, flowing gas curtains 180, pump beam sources 150, output beam 10, beam-shaping optic(s) 190 (e.g., lenses, folding mirrors, apertures, diffusers, beam-combining mirrors, etc.), pump beam edge-defining element(s) 160 (e.g., mirrors, optical elements, masks, etc.), etc.—may apply equally here, in part or in whole, in the context of system 1000b, in accordance with some embodiments. As can be seen further, system 1000b may include one or more pump beam sources 150 for transverse pumping of lasing amplifier 130 via one or more pump beams 152. Additionally, system 1000b may include beam-shaping optics 190 (e.g., beam-combining optic 198, diffuser 199) for the fast and slow axes, as well as have fast-axis and slow-axis focus points 193.

As with system 1000a described above, here in system 1000b, lasing amplifier 130 may include a window assembly 140 in which a flowing lasing gas 170 may be provided. Lasing amplifier 130 further may be configured, in accordance with some embodiments, to have one or more flowing gas curtains 180 (e.g., inner flowing gas curtain 180a and/or outer flowing gas curtain 180b) flowing along surface(s) interior to window assembly 140.

In accordance with some embodiments, window assembly 140 of system 1000b may include four optical windows: (1) a forward end window 142 (generally closer to output coupler 120); (2) a rearward end window 144 (generally closer to high-reflectivity mirror 110); (3) a first side window 146; and (4) a second side window 148 (situated substantially opposite first side window 146). It should be noted, however, that the present disclosure is not intended to be so limited, as in accordance with other embodiments, window assembly 140 may include fewer (e.g., 1, 2, or 3) or more (e.g., 5, 6, 7, 8, or more) optical windows, as desired.

Also, as previously noted, a flowing lasing gas 170 may be provided in lasing amplifier 130. More specifically, a gas mixture including at least some concentration of a lasing component (e.g., a gaseous amplifier) may be utilized as flowing lasing gas 170, in accordance with some embodiments.

Furthermore, as previously noted, one or more flowing gas curtains 180 may be provided along interior surface(s) of window assembly 140. More specifically, a flow of a gas depleted or devoid of the lasing component (and, therefore, substantially transparent to pump beam 152 and output beam 10) may be provided to flow over a given optical window through which (i) pump beam 152 and/or (ii) output beam 10 passes in operation of system 1000b, in accordance with some embodiments. In some cases, flowing gas curtain 180 may include the same component gases as flowing lasing gas 170, with the exception of being depleted or devoid of the lasing component. In some cases, the depletion of the concentration of the lasing component in the gas of flowing gas curtain 180 may be accomplished by maintaining that gas at a temperature which is lower than that of flowing lasing gas 170. In some cases, flowing gas curtain 180 may be further subdivided so that an inner flowing gas curtain 180a is depleted of the lasing component, while an outer flowing gas curtain 180b is further depleted of the lasing component. In some cases, inner flowing gas curtain 180a and outer flowing gas curtain 180b may be maintained at different temperatures. In those cases, inner flowing gas curtain 180a may be maintained at a temperature lower than flowing lasing gas 170 so that the concentration of the lasing component is reduced, but not so low a temperature that flow boundary materials that are in contact with both the lasing component of flowing lasing gas 170 and the gas of inner flowing gas curtain 180a become sufficiently reduced in temperature as to cause condensation of the lasing component or otherwise alter its concentration. In those cases, outer flowing gas curtain 180b, flowing adjacent to the inner surface of the window, may be maintained at a temperature much lower than that of inner flowing gas curtain 180a or flowing lasing gas 170, so that it can be maintained essentially devoid of the lasing component.

As with system 1000a described above, here in system 1000b, the overall configuration of lasing amplifier 130 and arrangement of flowing gas curtain(s) 180 and flowing lasing gas 170 with respect to window assembly 140 may be customized, as desired for a given target application or end-use. For example, consider FIG. 11, which illustrates a partial view of system 1000b of FIG. 10, in accordance with an embodiment of the present disclosure. As can be seen here, forward end window 142 and rearward end window 144 may be of substantially rectangular (e.g., rectangular or square) geometry and arranged substantially parallel to one another. As can be seen further, first side window 146 and second side window 148 may be of substantially rectangular (e.g., rectangular or square) geometry and arranged substantially parallel to one another. Thus, windows 142, 144, 146, 148 may be arranged to form a four-sided, open-ended, box-like shape, as generally shown. Flowing lasing gas 170 may flow through lasing amplifier 130 between windows 142, 144, 146, 148.

Figure 11:
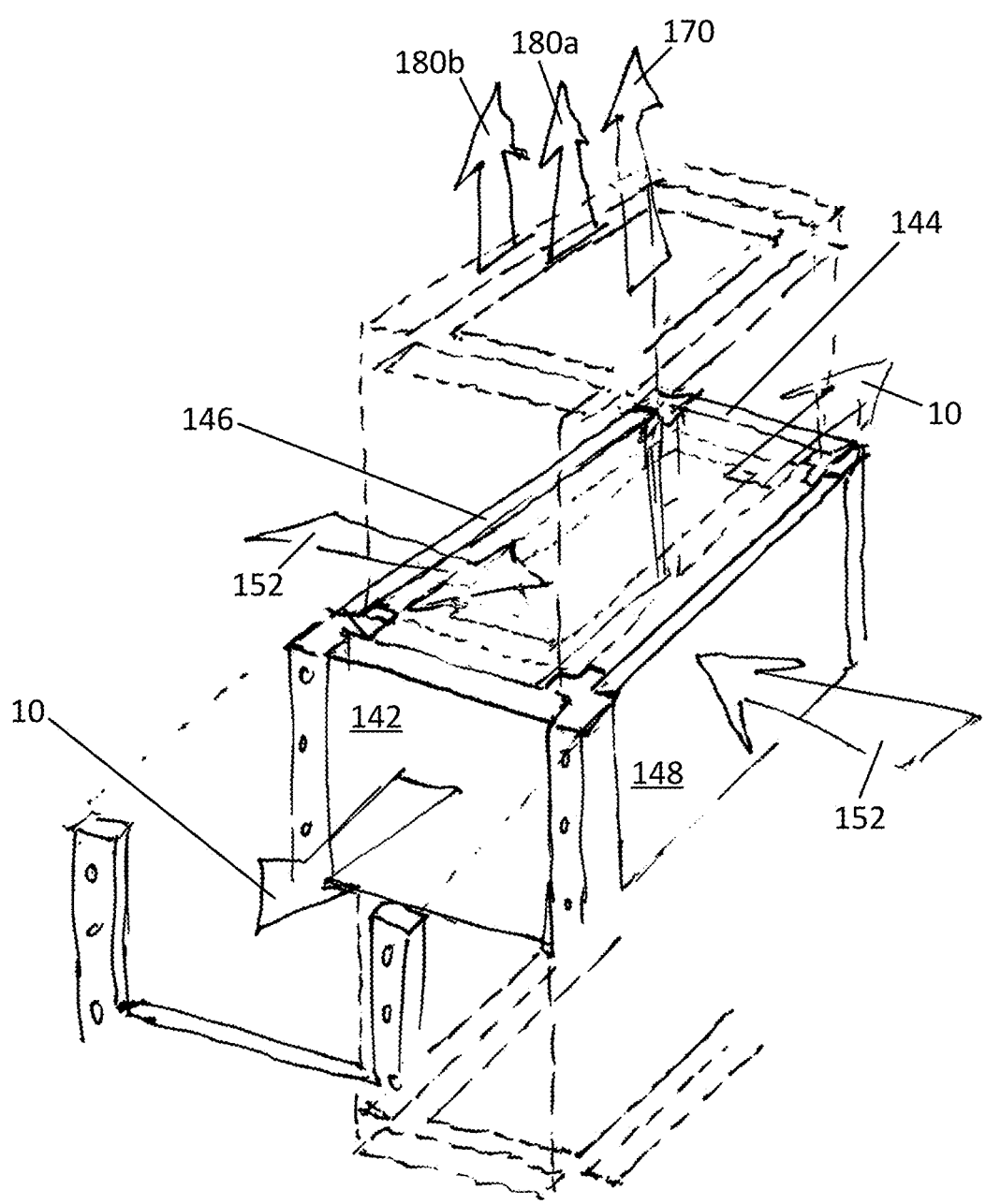
FIG. 11 illustrates a partial view of the system of FIG. 10, in accordance with an embodiment of the present disclosure.

Further regarding the example arrangement of FIG. 11, flowing gas curtain(s) 180 may be provided to flow between flowing lasing gas 170 and (optionally) any or all windows 142, 144, 146, 148. Optionally, a flowing gas curtain 180 between flowing lasing gas 170 and any/all windows 142, 144, 146, 148 may be subdivided into an integer number of subregions, in accordance with some embodiments. For example, if subdivided into two subregions, one flow may be an inner flowing gas curtain 180a adjacent to the flow of flowing lasing gas 170 and another flow may be an outer flowing gas curtain 180b between that inner flowing gas curtain 180a and the inside surface of a given window 142, 144, 146, 148. In the example configuration of FIG. 11, window assembly 140, flowing gas curtains 180, and the lasing volume of flowing lasing gas 170 may exhibit a generally rectilinear shape, where the height and width that define the dimensions of output beam 10 are approximately equal and the length is generally greater than either. In cases where the height and width are equal, then the aspect ratio is defined as the ratio of the length to the transverse dimension. It should be noted, however, that the present disclosure is not intended to be so limited, as in a more general sense, and in accordance with some other embodiments, an asymmetrical beam shape may be desired, and the rectangular box shape may have an aspect ratio that is greater than or less than unity.

As noted above, system 1000b may include beam-shaping optic(s) 190. In accordance with some embodiments, beam-shaping optic(s) 190 may be configured to transport pump beam 152 from pump source 150 to flowing lasing gas 170 while altering the dimensions of the pump beam 152 envelope as well as its divergence along the fast and slow axes. In some cases, beam-shaping optic(s) 190 may include one or more elements arranged to de-magnify the fast-axis illumination and magnify the slow-axis illumination. In accordance with some embodiments, beam-shaping optic(s) 190 may be configured as an afocal telescope. In some embodiments, beam-shaping optic(s) 190 may include cylindrical lenses 191, 192, 196, 197 and/or curved mirrors. In some cases, an intermediate focus point 193 optionally may be included. In some embodiments, beam-shaping optic(s) 190 may include cylindrical lens(es) 191, 192, 196, 197, providing an afocal telescope in either (or both) the fast and slow axes, optionally with (1) a focus of the fast-axis rays at a point 193 between the elements that focus along the fast-axis dimension and/or (2) a focus of the slow-axis rays at a point 193 between the elements that focus along the slow-axis dimension. In some embodiments, beam-shaping optic(s) 190 may include one or more mirrors configured to fold the optical path, thereby making it more compact. In some embodiments, beam-shaping optic(s) 190 may include curved mirror(s), providing focusing along one or more axes while also folding the optical path, thereby making it more compact.

As noted above, in some cases, several pump beam sources 150 (e.g., several stacks of laser diode bars) may be utilized. In some instances, it may be desirable to combine pump beams 152 of several pump beam sources 150 so that they form a substantially continuous illumination of flowing lasing gas 170, as if they emanated from a continuous pump beam source. Pump beam 152 combining may involve deflection of an entire pump beam 152 from one or more pump beam sources 150 by unique and differing angles so that the optical rays at the extreme edge of one pump beam 152 are adjacent and in alignment (e.g., having path and trajectory that change smoothly and continuously in both position and angle) with the optical rays at the adjacent extreme edge of the next pump beam 152. In accordance with some embodiments, this may be accomplished by using a multifaceted beam-combining mirror 198. In some embodiments, such mirror 198 may be positioned before the final converging element of beam-shaping optics 190 (e.g., the fast-axis telescope) and may provide deflections in the fast-axis direction. In some embodiments, beam combining may be accomplished using one or more prisms. In some embodiments, the prism(s) may be positioned to deflect in the slow-axis direction and may be positioned close to pump beam source 150 just before the slow-axis divergence causes pump beams 152 from two adjacent pump beam sources 150 to overlap and (optionally) may provide a correcting deflection at the image plane just before side window 146 of window assembly 140. It should be noted, however, that the present disclosure is not intended to be so limited, as in accordance with other embodiments, beam-shaping optic(s) 190 may include fewer (e.g., one) or more (e.g., 3, 4, 5, 6, 7, 8, or more) lenses, mirrors, and/or prisms, as desired.

Figure 13:
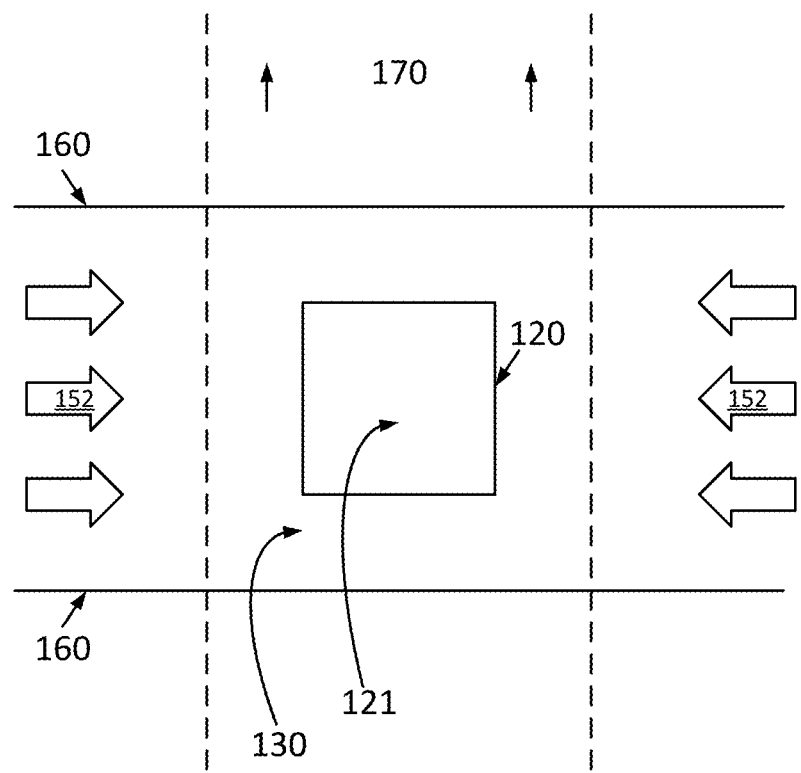
FIG. 13 illustrates a schematic view along the beamline of the arrangement of elements seen in FIG. 10, in accordance with an embodiment of the present disclosure.

In accordance with some embodiments, some arrangements may include edge surfaces in pump beam(s) 152, output beam 10, resonator beam 15, and lasing amplifier 130. For example, consider FIG. 13, which illustrates a schematic view along the beamline of the arrangement of elements seen in FIG. 10, in accordance with an embodiment of the present disclosure. As can be seen from this perspective, pump beams 152 with edge surfaces impinge from both sides on lasing amplifier 130 with flowing lasing gas 170. The dashed lines represent the boundary of the flowing lasing gas 170. The region enclosed by the edge surfaces of pump beam 152 and the boundary of flowing lasing gas 170 includes lasing amplifier 130. From this perspective, output coupler 120 is centered on lasing amplifier 130 such that resonator magnification will fill it with output beam 10 (which extends out from the page of the illustrated drawing and is not visually depicted in the representation). Additionally, as can be seen from this perspective, regions with flowing lasing gas 170 that are pumped also are illuminated with output beam 10, and geometric efficiency is optimized (or otherwise improved), in accordance with some embodiments.

Figure 14:
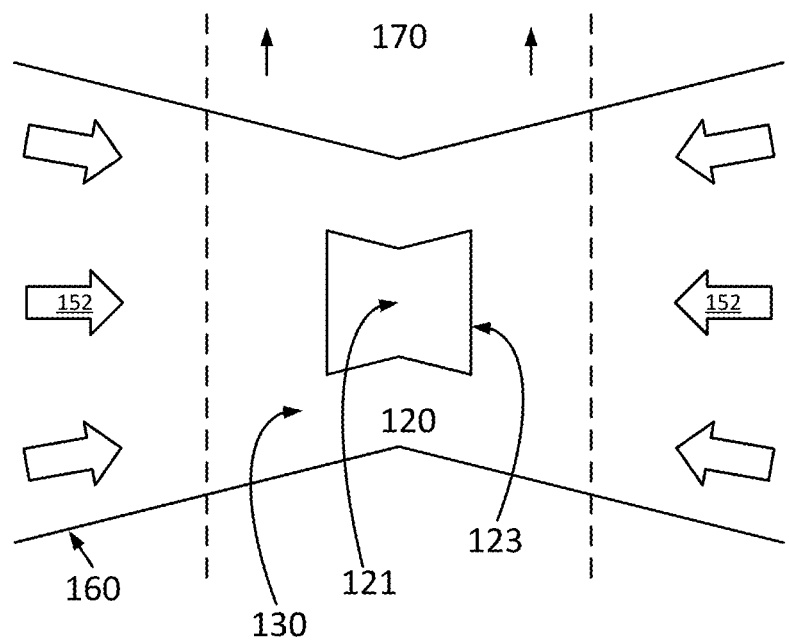
FIG. 14 illustrates a view along the output beamline of an arrangement of edge surfaces of a gaseous laser system, in accordance with another embodiment of the present disclosure.

In some cases, it may be advantageous to prepare pump beams 152 whose fast-axis beams terminate at edge surfaces that are not parallel to one another. For instance, consider FIG. 14, which illustrates a view along the output beamline of an arrangement of edge surfaces of a gaseous laser system, in accordance with another embodiment of the present disclosure. As can be seen, the outer perimeter of output coupler 120 may define bow tie-shaped beam edges of output beam 10. In these and other cases of non-parallel edge surfaces, the intensity of the pump light in the interior of lasing amplifier 130 may be greater than it otherwise would be if the edge surfaces were parallel to one another. This arrangement may be of particular utility, for example, in cases where pump beams 152 are propagating inward from two or more sides. In such instances, the two pump beams 152 may not share common edge surface(s) with one another. For such cases, appropriate choice of geometry of output coupler 120 with reflective inner portion 121 having reflective inner optical element 123, when magnified, can fill the pumped region enclosed by pump beam 152 edge surfaces with output beam 10. This geometry of output coupler 120 may allow the outer edge surfaces of pump beam 152 to be shared edge surfaces with output beam 10, thereby maintaining full (or otherwise sufficient) geometric efficiency.

Furthermore, as noted above, when pump beams 152 are configured to pump a volume from opposite sides while sharing common surfaces at the flow entrance and exit, the transmitted pump beams 152 may enter the optical path of the laser on the opposing side. When beams have parallel edge surfaces, canting pump beams 152 from the two sides at a small relative angle (e.g., about 5° or less) while still maintaining those common surfaces as much as practical, the transmitted pump beam 152 may be made to pass through the fast-axis focus 193 at a sufficiently distinct location so that it can be deflected. Alternatively (or additionally), the polarization of one pump beam 152 may be rotated (e.g., by) 90° at its source, in accordance with some embodiments. Then, when unabsorbed light crosses through lasing amplifier 130 and emerges at the other side, it can be deflected with a polarizing reflector.

The geometry and dimensions of a given lens of beam-shaping optic(s) 190 may be customized, as desired for a given target application or end-use. In accordance with some embodiments, a given amplifier volume, if chosen to be rectilinear and symmetric as to height and width, may have an aspect ratio (e.g., the ratio of the length to the transverse dimension) ranging from about 0.3-50 (e.g., about 2-8 or any other sub-range in the range of about 0.3-50).

As will be appreciated in light of this disclosure, although it may be desirable for diode laser stacks to have a height comprised of many bars, there are challenges to producing stacks with height greater than 20-50 bars (although some provide up to 100 or 150 bars). With the above provisions for combining pump beams 152 from multiple pump beam sources 150 along their fast axis using beam-combining mirror(s) 198, pump beam source 150 arrays easily can incorporate, for instance, eight stacks per side, with clear methods for reaching 32 or even 64 stacks combined along the fast axis, per side widow pump. Furthermore, pump beams 152 from multiple pump beam sources 150 may be combined along their slow axis, easily incorporating, for instance, eight stacks along the beam line. If a design is willing to forgo the divergence-reduction benefits of beam magnifying along the slow-axis (e.g., reducing the divergence in the amplifier so that the end surface is well-defined), then the slow axis may be illuminated simply by the overlap of the divergent beams from many pump beam sources 150, in accordance with some embodiments. In this case, combining two, ten, or even fifty or more stacks along the slow axis may become relatively straightforward, as the illumination pattern may be terminated at the ends (both the end nearest output coupler 120 and the end nearest high-reflectivity mirror 110) by a pump region-defining mirror, to deflect the slow-axis tail of pump beam 152 back into the uniformly illuminated gain region.

As flowing lasing gas 170 may have a single chosen concentration, it may be desirable, at least in some instances, to ensure that the illumination distribution of pump beam(s) 152 is as uniform as possible. However, the optical transport system described above (e.g., beam-shaping optic(s) 190) may include one or more afocal telescopes along one or more of the fast-axis and slow-axis directions, creating an image of pump beam source 150 (near the region of flowing lasing gas 170) which has dark regions between bars and may have localized dark regions due to individual emitters that underperform. To address this, a diffuser 199 optionally may be incorporated into the optical transport system for pump beam 152, in accordance with some embodiments. In some cases, such diffuser 199 may be disposed, for example, near a waist of pump beam 152.

It should be noted, however, that the characteristics of a given component of beam-shaping optic(s) 190 are not intended to be so limited. For example, in some cases, stepped mirror(s) may be utilized to eliminate dark spaces between bars, thereby increasing the illumination intensity without increasing the divergence, in accordance with some embodiments.

In some embodiments, pump beams 152 may be prepared from two pump beam sources 150 with polarizations perpendicular to one another and combined through an element that transmits one polarization and reflects the other. In some embodiments, two pump beam sources 150 may be positioned so that their pump beams 152 are spatially offset in the fast-axis direction by one-half-bar spacing and combined using a comb-like reflector, such that pump beams 152 from one stack are reflected on stripes of mirrors while pump beams 152 from the companion offset stack are transmitted through the gaps between those reflective stripes. Other suitable configurations for beam-shaping optic(s) 190 will depend on a given target application or end-use and will be apparent in light of this disclosure.

Radial-Transverse Pumping

In accordance with some embodiments, a system provided as described herein may be configured for radial-transverse pumping (e.g., pump beam 152 light may enter lasing amplifier 130 through a surface that is shared with resonator beam 15 along one or more paths that intersect a central axis of symmetry). In some such instances, the illumination pattern of resonator beam 15 formed by unstable resonator 100 (e.g., the magnified image of output coupler 120 reflected from high-reflectivity mirror 110) may coincide with the several surfaces that enclose the pumped region. In some cases, the source of pump beam 152 may be outfitted such that the edges of its illumination along the fast-axis direction are directed to converge, thereby allowing the intensity from that pump beam 152 to increase as a function of its depth within lasing amplifier 130, at least partially compensating for the attenuation of pump light in the gain medium. In some cases, that convergence is configured such that the edge surfaces of the illumination meet at a symmetry axis within the lasing medium, thereby coming to a focus.

In accordance with some embodiments, pump beam 152 may be provided to enter an amplifier region with edge surfaces along the fast axis of the pump beam 152 that are not parallel to each other but instead converge towards one another such that they come to a focus in the fast axis direction. Furthermore, that focus may be placed on or near the optical axis of unstable resonator 100. In such cases, resonator beam 15 will share these surfaces because magnification of any inner portion of resonator beam 15 will illuminate the pumped portion of lasing amplifier 130 when magnified by the optics of unstable resonator 100.

Figure 15:
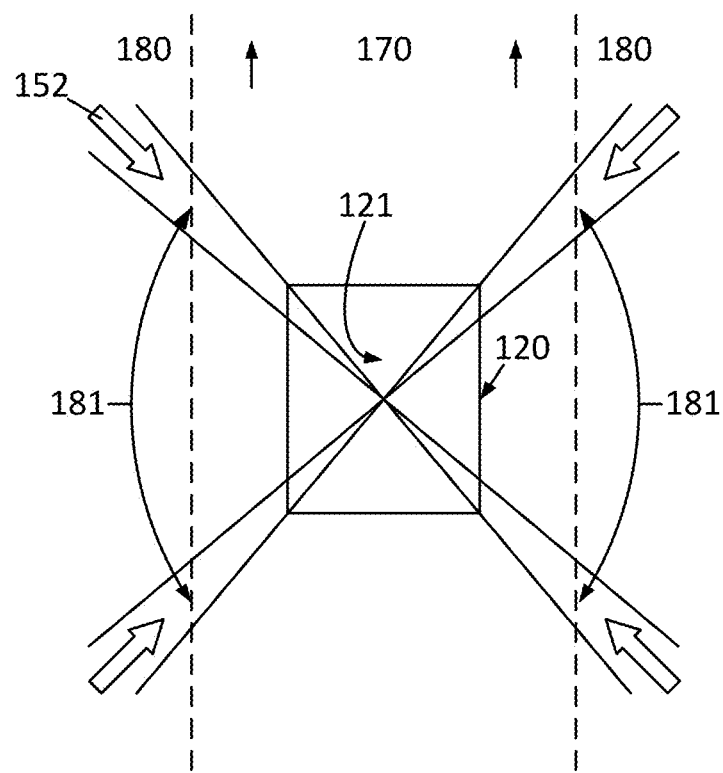
FIG. 15 illustrates four pump beams with radial edge surfaces converging to a focus at a symmetry axis, in accordance with an embodiment of the present disclosure.

Consider FIG. 15, which illustrates four pump beams 152 with radial edge surfaces converging to a focus at a symmetry axis, in accordance with an embodiment of the present disclosure. The dashed lines seen in FIG. 15 represent the boundary of the flowing lasing gas 170. As can be seen, as viewed from the direction of output beam 10, pump beams 152 enter from the side of lasing amplifier 130, with edge surfaces that converge to a point that is also the optical axis. In such cases, reflective inner portion 121 of output coupler 120 does not need to share the geometry of pump beams 152 and output beam 10. Each pass of resonator beam 15, which expands by the magnification of unstable resonator 100, will reproduce the central region of this illumination pattern on the outer regions. Pump beams 152, entering radially, with edge surfaces that pass through the optical axis, and resonator beam 15 propagating axially with its edge surfaces also passing through the optical axis, are shared. In cases where the edge of the amplifier region is defined by the boundary between a transverse saturated flow (e.g., flowing lasing gas 170) and a flowing inactive protective curtain (e.g., flowing gas curtain 180) where pump beams 152 enter from the sides, that amplifier boundary 181 should coincide, after magnification, with straight edges of the inner feedback portion of output coupler 120.

Alternative physical embodiments can achieve this overlap between pump beam 152 and resonator beam 15 geometry. Note that there can be inactive regions between converging pump beams 152. For instance, consider FIG. 16, which illustrates an optical arrangement similar to that utilized in FIG. 15, in accordance with an embodiment of the present disclosure. As can be seen, one or more solid, inactive, wedge-shaped structures 210 may be included in the arrangement and configured for use in thermally managing the system (e.g., providing cooling by removing heat), in some instances such that use of a flowing lasing gas 170 optionally may be reduced or omitted. As will be appreciated in light of this disclosure, the wedge-shaped pump volumes and collocated wedge-shaped output beam volumes 210 will not converge to a perfect line at the optical axis of unstable resonator 100 in practical implementations, and, therefore, the geometric efficiency likely will be only near perfect but not perfect.

Figure 16:
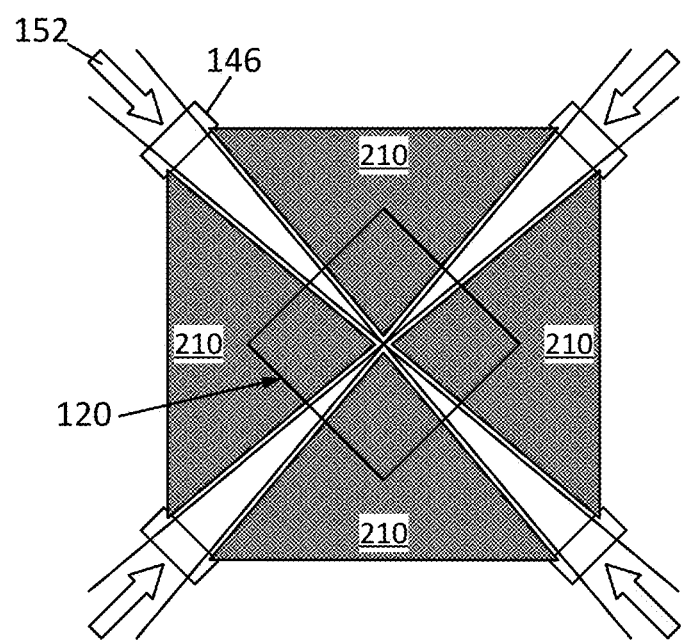
FIG. 16 illustrates an optical arrangement similar to that utilized in FIG. 15, in accordance with an embodiment of the present disclosure.

As can be seen from comparing FIGS. 15 and 16, pump beams 152 are prepared with edge surfaces converging towards the optical axis of unstable resonator 100. Output coupler 120 magnifies the illumination impinging on it to form resonator beam 15, resulting in output beam 10, which geometrically overlaps the pumped region. However, wedge-shaped structures 210 are disposed between pump beams 152 (e.g., to promote removal of heat). Because windows 146 are depicted at an angle (e.g., of about) 45°, the perimeter of output coupler 120 has a cutoff of its reflective inner portion 121 at the same angle.

Furthermore, the number of wedge-shaped pump beams 152 with edge surfaces passing through the optical axis is not limited, because wedge-shaped resonator beams 15 will form having edge surfaces that coincide with those of pump beams 152. This will occur whether the reflective inner portion 121 of output coupler 120 has (a) a plurality of wedged-shaped reflective surfaces or (b) a single reflective surface of a given geometry (e.g., rectangular, square, polygonal, or circular).

FIG. 17 illustrates a view along the output beamline of an arrangement of edge surfaces of a gaseous laser system, in accordance with another embodiment of the present disclosure. As can be seen, output coupler 120 magnifies the illumination impinging on it to form resonator beam 15 which geometrically overlaps the pumped region out to the limits of lasing amplifier 130 (represented by the dashed circle). The quantity of wedge-shaped pump beams 152 with converging edge surfaces and wedge-shaped structures 210 may be customized, as desired, and in at least some instances may be an even number. In some cases, the quantity is at least eight (e.g., 16, 32, 64, 128, or other).

Pump Beam Intensity Distributions

Returning to FIG. 12A (discussed above), at least one existing approach to producing a DPAL system seeks to confine pump power (100 kW) within a spatial distribution that resembles a Gaussian, having a width as narrow as possible, a central peak illumination as high as possible, and a poorly defined edge. Such a distribution may be accomplished by placing diode stack pump sources close to the amplifier region so that the slow-axis divergence does not spread too much, choosing a stack height along the fast-axis that approximates the desired width, and positioning several stack sources around a quasi-spherical dome, all aimed at the center of the amplifier region. Presuming a FWHM (in both directions) of 3.6 cm, the peak intensity might be very high (as high as 26 kW/cm$^2$) with a portion of that power penetrating flowing lasing gas 170 and emerging out the other end underutilized. The full width at one-tenth maximum (FWTM) would be 6.58 cm, providing an intensity of 2.6 kW/cm$^2$ at a radius of 3.29 cm, with intensity dropping rapidly with radius. At much larger radii, the pump intensity would be insufficient to maintain a population inversion, leading to unity or negative gain. Furthermore, the pump illumination spatial profile forms a waist along the axis at some depth within the amplifier region, with increased transverse dimension near the front and back of the amplifier. It has been observed that the threshold for DPAL lasing is typically on the order of 200 W/cm$^2$ under the right conditions. Pump illuminations of 2.6 kW/cm$^2$ can achieve up to 70-85% efficiency (depending on the spectral linewidth of the pump source, the pressure of the gas medium, and other factors), but only with optimally chosen alkali density. However, raising the alkali density above this level to absorb a significant fraction of the central peak intensity may cause the regions pumped at lower intensity to have incomplete penetration of the pump illumination and, thus, may produce negative gain.

Figure 12A:
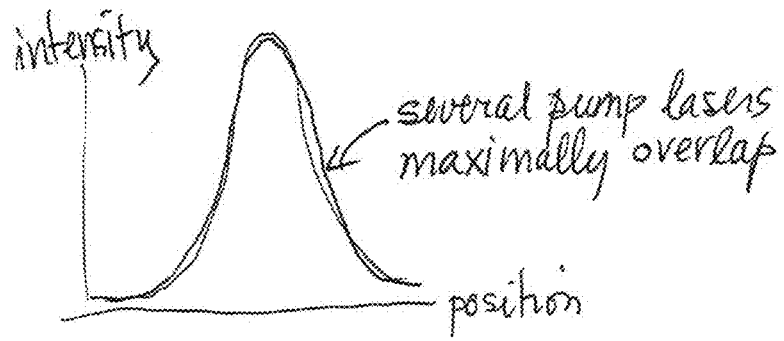
FIG. 12A illustrates an existing approach to pump beam intensity distribution for an existing DPAL system.
Figure 12B:
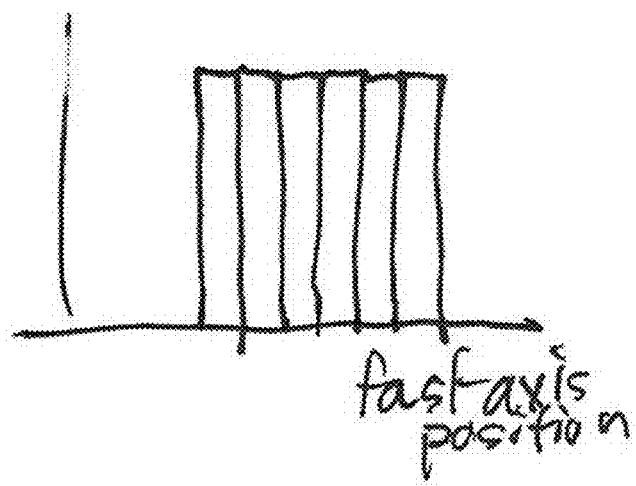
FIGS. 12B-12E illustrate several example pump beam intensity distributions in accordance with some embodiments of the present disclosure.

Contrary to FIG. 12A discussed above, FIGS. 12B-12E illustrate several example pump beam intensity distributions in accordance with some embodiments of the present disclosure. As can be seen from FIG. 12B, the pump beam intensity along the fast axis may be comprised of several segments, each from a different pump source and de-magnified (e.g., concentrated), aimed such that their illumination patterns just touch but do not overlap. Since they are comprised of the de-magnified images of the pump beam sources 150 which are themselves comprised of illuminating bars with dark regions between them, a diffuser 199 placed in the path (optionally near the waist of pump beam 152) may be used to homogenize pump beam 152 output thereby. The edge of the illumination may be defined by the diffused image of the final bar of the final stack in the array of pump beam source 150.

Figure 12C:
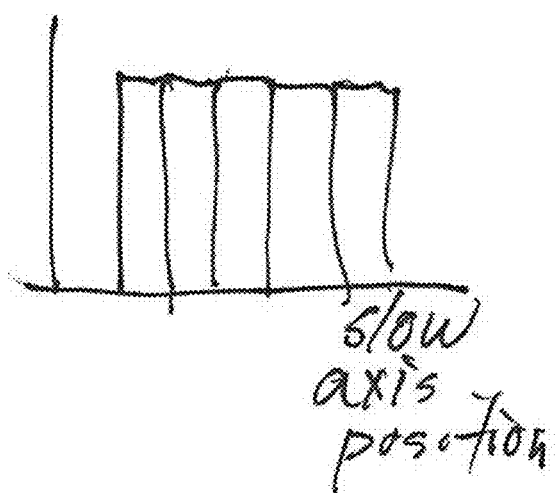

As can be seen from FIG. 12C, the pump beam intensity along the slow axis also may be comprised of several segments, each from a different pump beam source 150, and transported through one or more beam-shaping optics 190 to illuminate the amplifier region of flowing lasing gas 170. In some embodiments, the beam-shaping optics 190 may include an afocal telescope such that an image of the slow axis may be formed near the amplifier region. In some such embodiments, those afocal telescopes may incorporate one or more beam deflectors, such as prisms, to allow their illumination patterns to just touch but not overlap. The edge of the illumination may be formed by the edge of the stack and may diverge through the amplifier region according to the (magnified) divergence of the slow axis. In some embodiments, the array of pump beam source 150 may be required to illuminate an amplifier region that may be quite long, especially in cases of transverse pumping.

Figure 12D:
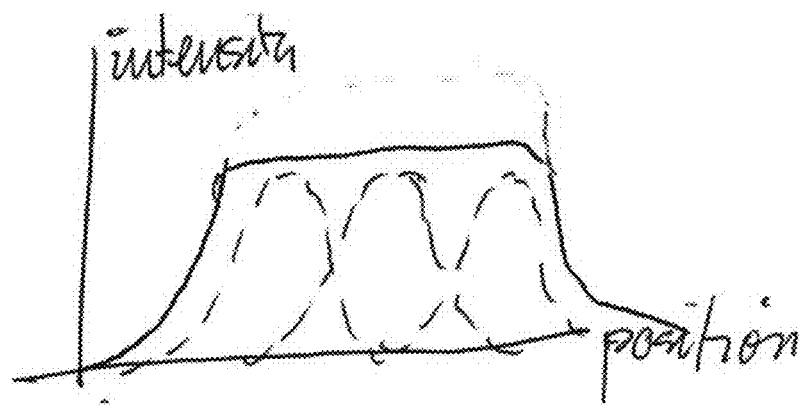
Figure 12E:
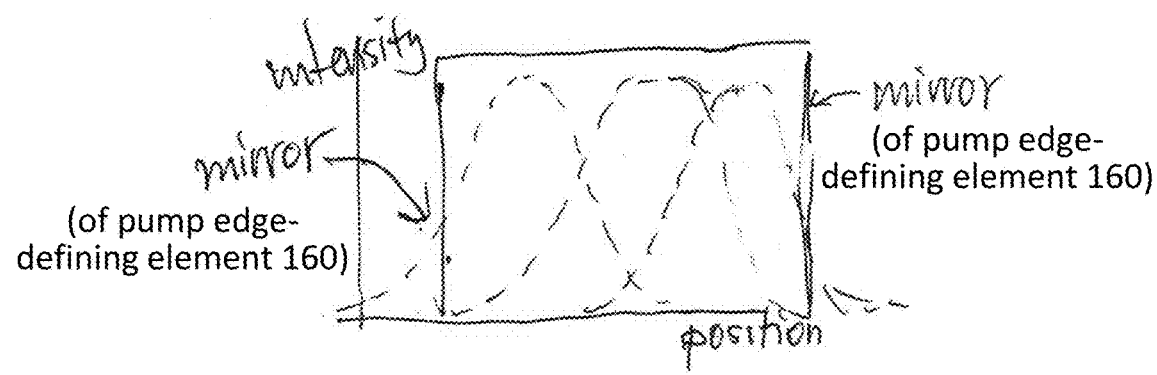

As can be seen from FIG. 12D, the pump beam intensity along the slow axis may be comprised of the overlapping beams projected directly from the pump sources to the illuminated region of flowing lasing gas 170, without slow-axis transport optics. In these cases, the edge of the illumination may not be well-defined but instead may be formed by the projected slow-axis divergence. In these cases, as can be seen from FIG. 12E, it may be beneficial to introduce mirrors at the edge of the slow-axis illumination to produce a well-defined edge and to relocate the divergent pump light back into the illuminated region of flowing lasing gas 170. The arrangement of mirrors may be accomplished by one or more mirrors approximately parallel to the path of the pump rays, deflecting them into the amplifier through small angle reflections, or by two or more mirrors approximately perpendicular to the path of the rays, reflecting them back towards pump beam source 150, and then reflecting again into the illuminated region of flowing lasing gas 170.

It should be noted, however, that these techniques are not intended to be the only approach to accomplishing a well-defined edge of a pump beam 152 that is shared by output beam 10. For example, as will be apparent in light of this disclosure, definition of the edge surfaces may be accomplished using an engineered diffuser 199 to produce a pump beam 152 with uniform intensity and a well-defined edge, in accordance with some embodiments.

Thus, as will be appreciated in light of this disclosure, the example existing approach for longitudinal pumping discussed above in relation to FIG. 12A may be improved upon using techniques disclosed herein, in accordance with some embodiments. For instance, distributing the 100 kW of pump power uniformly, in accordance with some embodiments, at 2.6 kW/cm² may allow for uniformly illuminating a square region with 6.2 cm on a given side. Because the divergence of the pump beam can be reduced from as much as 45° to about 5° (e.g., the angle required between the transport optics of the pump array and the beam path), the amplifier region can be extended along the beam path from 2 cm to 20 cm, in accordance with some embodiments. In accordance with some embodiments, the alkali density may be chosen to maximize the gain for this illumination intensity and may be a much lower alkali density than in the aforementioned existing approach. Moreover, greater length of the amplification region, lower peak pump intensity, lower peak beam intensity, and lower alkali density may produce lower levels of parasitic physics processes, such as energy pooling, ionization, and amplified spontaneous emission (ASE), in accordance with some embodiments.

Pulsed Operation

In some instances, it may be desirable to provide a system configuration that amplifies a pulse one or more times before reaching the output coupler and providing a pulsed output beam. Inclusion of one or more independent paths through the amplifier can be accomplished with a folded beam geometry, wherein each path through the amplifier utilizes a unique pair of high-reflectivity mirrors. Inclusion of one or more chicane segments which receive the portion of the beam from the output coupler and condition the beam for reinsertion into the amplifier paths, described herein, further can be utilized to accomplish this task.

In some instances, the folded beam geometry may include a plurality of high-reflectivity focusing mirrors on opposite sides of the amplifier. The mirrors are characterized by a focal length. In some embodiments, the distance between two mirrors is the sum of their focal lengths. This confocal geometry allows a parallel beam in a forward direction, reflecting and passing through a focus in the opposite direction. Thus, each pass through the amplifier involves a pair of mirrors, while the return path directs the beam to advance to the next pair.

In some instances, the chicane element(s) may incorporate four segments. First, the segment from the output coupler may pass through a focus to impinge on a first chicane mirror. If the length of this segment is the sum of the mirrors' focal lengths, then the beam will emerge collimated. In some instances, the collimated beam may be magnified by the ratio of the focal lengths. In some instances, the collimated beam may be directed to a second chicane mirror. The second chicane mirror then may direct the beam through a focus to impinge on the first mirror of the folded beam path. In some instances, the beam is further magnified by the ratio of the focal lengths of these two mirrors. In some cases, the total length of the chicane segment(s) is equal to the length of a single traversal of a folded beam path, thereby preserving the cycle time.

In some instances, a pulsed beam may be desired. In these instances, the use of a saturable absorber may be utilized. A saturable absorber may include elements chosen to absorb energy when the beam is less intense, but which bleach to transparency when the beam is more intense. In some instances, the saturable absorber may include a cell with a quenching gas and a vapor that selectively absorbs the laser energy when the vapor is in the ground state. When the vapor is illuminated with high intensity, however, it becomes saturated and unable to absorb energy. When inserted into a lasing resonator cavity, it may impose a temporal structure on the beam so that the energy is preferentially removed from periods of lower beam intensity and added to periods of high intensity, thereby forming a pulse.

In some instances, it may be desirable for the closed ring geometry of a folded path resonator with a reinsertion chicane to support only one direction of propagation rather than allowing beam circulation in both clockwise and counterclockwise directions. In these instances, it may be beneficial to locate the saturable absorber at a focus in the output chicane where circulation in one direction would be spatially localized to a point, while circulation in the other direction may be collimated and lower intensity. In these instances, the saturable absorber preferentially may absorb the lower intensity beam circulating in the undesired direction.

In some cases, a uniform train of beam pulses which repeats with the full circulation time of the total beam path length may be desired, while preventing the formation of pulses with greater frequency. In some cases, a uniform train of beam pulses which repeats with a period that is an integer fraction of the circulation time may be desired. This may be accomplished, in accordance with some embodiments, utilizing a periodic beam shutter that is based on the principle of electron paramagnetic resonance (EPR). More specifically, alkali atoms, with one electron outside of closed orbitals, can be polarized by placing a vapor cell that encloses an alkali vapor, a buffer gas, and a quenching gas in a uniform magnetic field and illuminating its interior with resonant D1 circularly polarized light along the field direction. If the stable eigenstate (either aligned or anti-aligned) is perturbed, the transverse component will process about the magnetic field with a frequency determined by the magnitude of the field and the gyromagnetic ratio of the atom. In some cases where the atomic population may be prepared suddenly by a pulse of circularly polarized light with a wavelength that is resonant with the D1 transition in a state which is not aligned with the magnetic field (i.e., not the eigenstate) but rather a coherent mixture of eigenstates, defining a transverse polarization, this state then will undergo precession about the magnetic field. In the instant of polarization, the vapor is in a saturated state, unable to absorb additional circularly polarized light. As it precesses, it evolves such that it becomes absorbing. After a complete rotation, the vapor returns to its transparent state. As such, a vapor cell immersed in a magnetic field that is transverse to the propagation direction of a laser pulse can act as a periodic shutter, becoming transparent and absorbing with a desired periodicity.

In some instances, it may be beneficial to select a preferred polarization of the beam for at least a portion of the closed ring path. In some instances, a circularly polarized beam is desired for at least that portion of the beam where the EPR beam shutter is disposed. In some instances, it may be desirable to accomplish beam polarization without incurring energy losses. In these instances, it may be beneficial to utilize a polarizing beam splitter that divides the beam into parallel and sideways plane polarizations. In these embodiments, a quarter-waveplate may be disposed in the beam between the plane polarizer and the EPR beam shutter. In these embodiments, lossless transport may be preserved by utilizing a quarter-waveplate to return the circularly polarized beam back to its plane polarized state before returning to the plane polarizing splitter.

Therefore, it may be desirable to configure system 1000 to deliver an output beam which is pulsed, at least in some instances. To that end, system 1000 may employ a folded-beam architecture that mode-locks its resonator cavity, in accordance with some embodiments. In this manner, the properties of resonator beam 15 may be established and controlled in a series of paths and optical elements after incidence with output coupler 120 and before reinsertion at the beginning of the folded beam sequence. And as will be appreciated in light of this disclosure, the temporal structure of resonator beam 15, established by mode-locking, will repeat with a period that is equal to the circulation time of that resonator beam 15.

Consider FIGS. 18-22, which illustrate several views of an unstable resonator 100' configured to provide a pulsed output beam 10' in accordance with an embodiment of the present disclosure. As can be seen here, unstable resonator 100' may include a first plurality of high-reflectivity mirrors 310, a second plurality of high-reflectivity mirrors 320, an enclosure 330, and at least one chicane segment 340. Each of these elements is discussed in turn below. Generally, FIGS. 18-22 illustrate an unstable resonator 100' with a folded-beam layout (e.g., a ring layout) in which various optical elements are included to direct portion(s) of resonator beam 15 along a closed path which is non-linear. More specifically, FIGS. 18-22 illustrate the use of at least one chicane segment 340 to effectuate deflection and reinsertion of one or more deflected beams 15' in production of a pulsed output beam 10', in accordance with some embodiments.

As noted above, unstable resonator 100' may include a first plurality of high-reflectivity mirrors 310 and a second plurality of high-reflectivity mirrors 320, the quantity, arrangement, and geometry of which may be customized, as desired for a given target application or end-use. In accordance with some embodiments, mirrors 310, 320 may be positioned along a line that passes through the center of lasing amplifier 130 of unstable resonator 100'. More specifically, first plurality of mirrors 310 may be disposed on one side (e.g., an upstream side) of an enclosure 330, while second plurality of mirrors 320 may be disposed on an opposing side (e.g., a downstream side) of enclosure 330, with output coupler 120 intervening between that second plurality of mirrors 320 and enclosure 330.

A given constituent mirror of first plurality 310 and a given constituent mirror of second plurality 320 may be designated as a corresponding mirror pair. In accordance with some embodiments, the two constituent mirrors of the pair may be separated from a central point at (or near) the center of the interaction volume within lasing amplifier 130 by a distance that is equal to their common focal length. This confocal geometry may provide for a beam orbit that is intrinsically stable, alternating between parallel collimated beams and beams with a central focus, in accordance with some embodiments.

In operation of system 1000, the amplifier region may be optically pumped from both sides with pump beams 152 that are substantially uniform throughout a pump volume and have edges of illumination defined by the distribution of their fast-axis and slow-axis divergence and the optical transport lenses. The amplifier region may be substantially defined by the edge surfaces of the pumped volume and the transition edge surfaces between the flowing saturated gas and the flowing gas, which is desaturated of the active vapor. In this system 1000, the orientation of mirror pluralities 310, 320 may be adjusted so that a rearward mirror of a given mirror pair receives resonator beam 15 from a previous mirror pair and a forward mirror of that given mirror pair directs resonator beam 15 towards a rearward mirror of a next or subsequent mirror pair. Thus, a pulse of resonator beam 15 may propagate through lasing amplifier 130 from the rearward mirror of a given pair (e.g., a constituent mirror of the first plurality of mirrors 310) to the forward mirror of that pair (e.g., a constituent mirror of the second plurality of mirrors 320). The forward mirror then may direct the pulse of resonator beam 15 to return through the region of lasing amplifier 130 and form a focus in that region to arrive at a rearward mirror (e.g., a different constituent mirror of the first plurality of mirrors 310) of an adjacent mirror pair. In this manner, each pair of mirrors may guide the pulse of resonator beam 15 through lasing amplifier 130. When all passes through the amplifier region have been completed, the beam pulse may arrive at output coupler 120, which (a) directs an outer portion to become pulsed output beam 10' and (b) provides an inner portion to a separate series of optical elements (e.g., a chicane segment 340, discussed below) to establish the beam properties and begin the amplification stages over again. Otherwise stated, a final rearward mirror may direct the beam pulse to a final forward mirror (e.g., output coupler 120), where (a) an outer portion of resonator beam 15 may propagate out of system 1000 as a pulsed output beam 10' and (b) an inner portion of that resonator beam 15 may be diverted from a main optical axis of unstable resonator 100' as a deflected beam 15' which becomes magnified in a series of paths and optical elements (e.g., a chicane segment 340, discussed below) and then is reinserted at the beginning of the folded-beam sequence.

Also, as noted above, unstable resonator 100' may include an enclosure 330. In operation of system 1000, enclosure 330 may be configured to receive (1) a buffer gas at a given pressure, (2) a quenching gas at a given partial pressure, and (3) an active vapor, which may be sustained at a given temperature (e.g., by a controller). In this manner, enclosure 330 may serve to enclose lasing amplifier 130 and any surrounding amplifier region(s). Furthermore, enclosure 330 may include a plurality of windows (e.g., at least a first window and an opposing second window) through which resonator beam 15 may pass in operation of system 1000 (e.g., on its way to and from a chicane segment 340, discussed below). As generally can be seen from FIGS. 18-22, enclosure 330 may be disposed at (or near) a focal point of the pluralities of mirrors 310, 320, between that first plurality 310 and output coupler 120.

As noted above, unstable resonator 100' further may include a chicane segment 340 which, as can be seen from FIGS. 18-22, may lie outside of the main optical pathway of unstable resonator 100'. Generally, chicane segment 340 may be configured, in accordance with some embodiments, to receive a deflected beam 15' which has been diverted out of a main optical axis (e.g., main optical pathway) of unstable resonator 100' (e.g., by a reflective portion of output coupler 120) and to direct that deflected beam 15' through a series of optical elements before eventually returning that deflected beam 15' to the main optical pathway of unstable resonator 100' for further propagation therein. To such ends, the optical elements of chicane segment 340 may be customized, as desired for a given target application or end-use. In accordance with some embodiments, chicane segment 340 may include, for example, a saturable absorber 341, a first chicane mirror 342, a plane polarizer 343 positioned between a first waveplate 344 and a second waveplate 345, an electron paramagnetic resonance (EPR) cell 346 (optionally disposed within a magnetic enclosure 347), and a second chicane mirror 348. Each of these elements is discussed in turn below.

In operation of unstable resonator 100', saturable absorber 341 may be configured to receive deflected beam 15' from output coupler 120. To that end, saturable absorber 341 may be disposed, for instance, at the focus of deflected beam 15'. Saturable absorber 341 may be configured, in accordance with some embodiments, to absorb a significant fraction of lower intensity light while becoming saturated and may transmit a higher fraction when the received deflected beam 15' is more intense. As will be appreciated in light this disclosure, this absorption may magnify temporal instabilities in the received deflected beam 15', thereby (a) allowing periods of higher beam intensity to grow, depleting a greater proportion of the energy of pump beam 152, while (b) periods of lower intensity are attenuated, utilizing a lesser proportion of the energy of pump beam 152. When analyzed from the perspective of the allowed longitudinal modes of the unstable resonator 100', the phases of these several modes may become locked to provide a circulating pulse of energy. More specifically, saturable absorber 341 may serve, at least in part, to lock the longitudinal modes of one direction of circulation and eliminate the other direction of circulation.

In accordance with some embodiments, saturable absorber 341 may be configured to yield a beam pulse that ultimately travels twice therethrough-once when propagating towards output coupler 120 and once when propagating away from output coupler 120. To reduce (e.g., minimize) the frequency of distinct pulses in pulsed output beam 10', some embodiments optionally may place saturable absorber 341 directly adjacent to either high-reflectivity mirror 110 or output coupler 120. In some such embodiments, saturable absorber 341 may be configured to envelop high-reflectivity mirror 110 or output coupler 120.

In accordance with some embodiments, inclusion of a saturable absorber 341 may support propagation of beam modes in either (or both) clockwise and counterclockwise circulation directions. Generally, though, the overall design of system 1000 may favor only one of these modes (e.g., a mode which produces a parallel pulsed output beam 10' along a preferred direction). In these cases, saturable absorber 341 may be placed at a location where (a) one preferred circulating mode has a focus and (b) undesired mode(s) have a larger dimension. In this configuration, undesired mode(s) may be attenuated, and the desired mode may receive most of the amplification.

After passing through saturable absorber 341, deflected beam 15' may be incident with a first chicane mirror 342, which generally may be a high-reflectivity mirror (e.g., like high-reflectivity mirror 110, discussed above). The resultant deflected beam 15' then may pass through a series of a first waveplate 344, a plane polarizer 343, and a second waveplate 345. First waveplate 344 may be, for example, a quarter-waveplate configured for either a positive or negative phase change of deflected beam 15', while second waveplate 345 may be a quarter-waveplate configured for an opposite phase change. In an example case, one of waveplates 344, 345 may be oriented with its axis at +45°, while the other of waveplates 344, 345 correspondingly may be oriented with its axis at −45°. In this manner, first waveplate 344 may convert deflected beam 15' to circular polarization, while second waveplate 345 may restore the plane polarization of deflected beam 15' to retain full efficiency.

Exiting second waveplate 345, the resultant deflected beam 15' then may pass through an EPR cell 346 configured, in accordance with some embodiments, to serve as a periodic shutter in chicane segment 340. To such end, EPR cell 346 may be (or otherwise may include) a vapor cell enclosing at least one of an alkali vapor, a buffer gas, and a quenching gas and may be immersed in a magnetic field (e.g., a magnetic field transverse to a propagation direction of deflected beam 15'). In some embodiments, EPR cell 346 optionally may be enclosed within a magnetic enclosure 347. Exiting EPR cell 346, the resultant deflected beam 15' then may be incident with a second chicane mirror 348, which generally may be a high-reflectivity mirror (e.g., like high-reflectivity mirror 110, discussed above) positioned opposite first chicane mirror 342.

Figure 21:
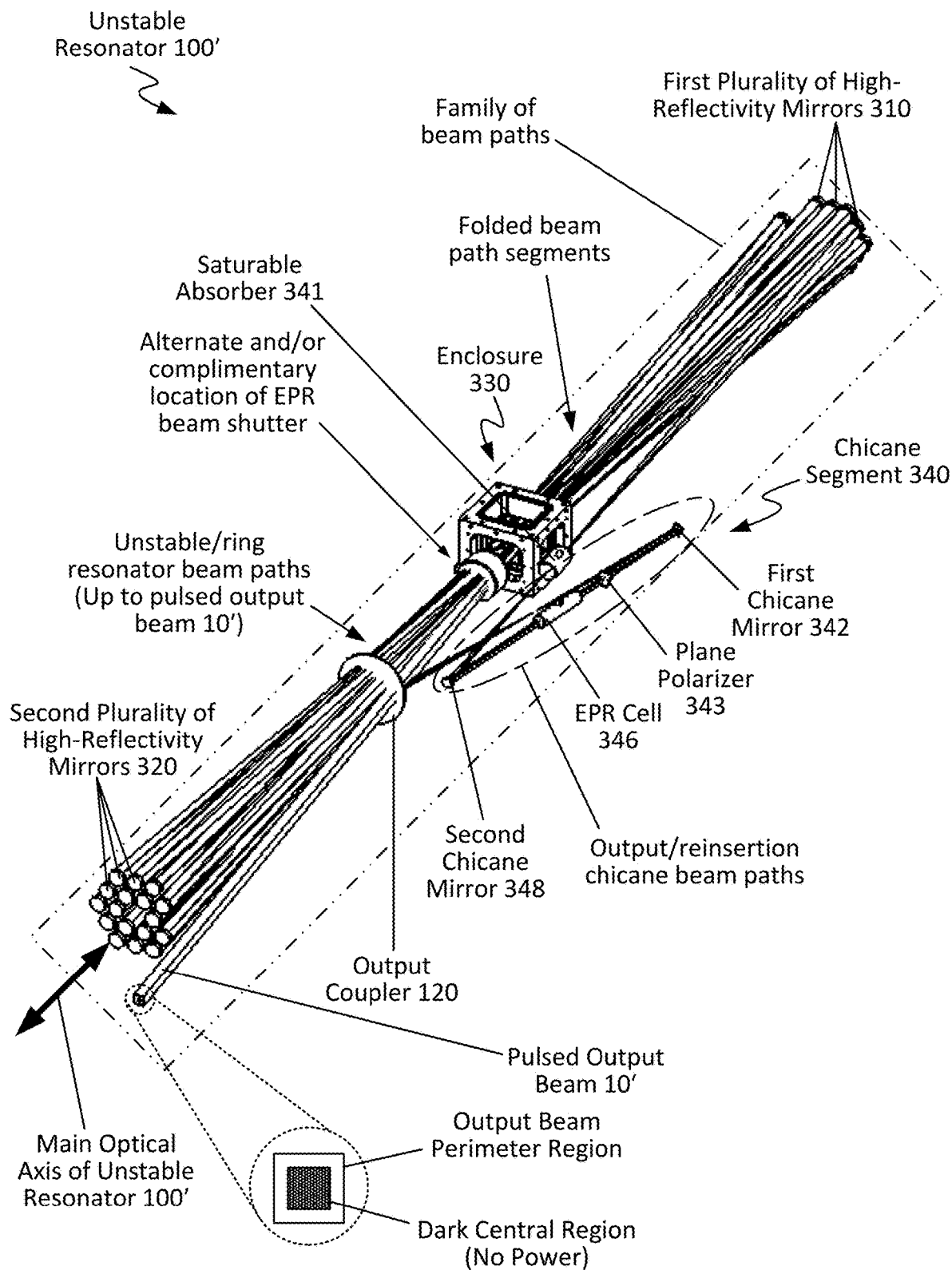
FIG. 21 illustrates an isometric view of an unstable resonator of a gaseous laser system configured in accordance with another embodiment of the present disclosure.
Figure 22:
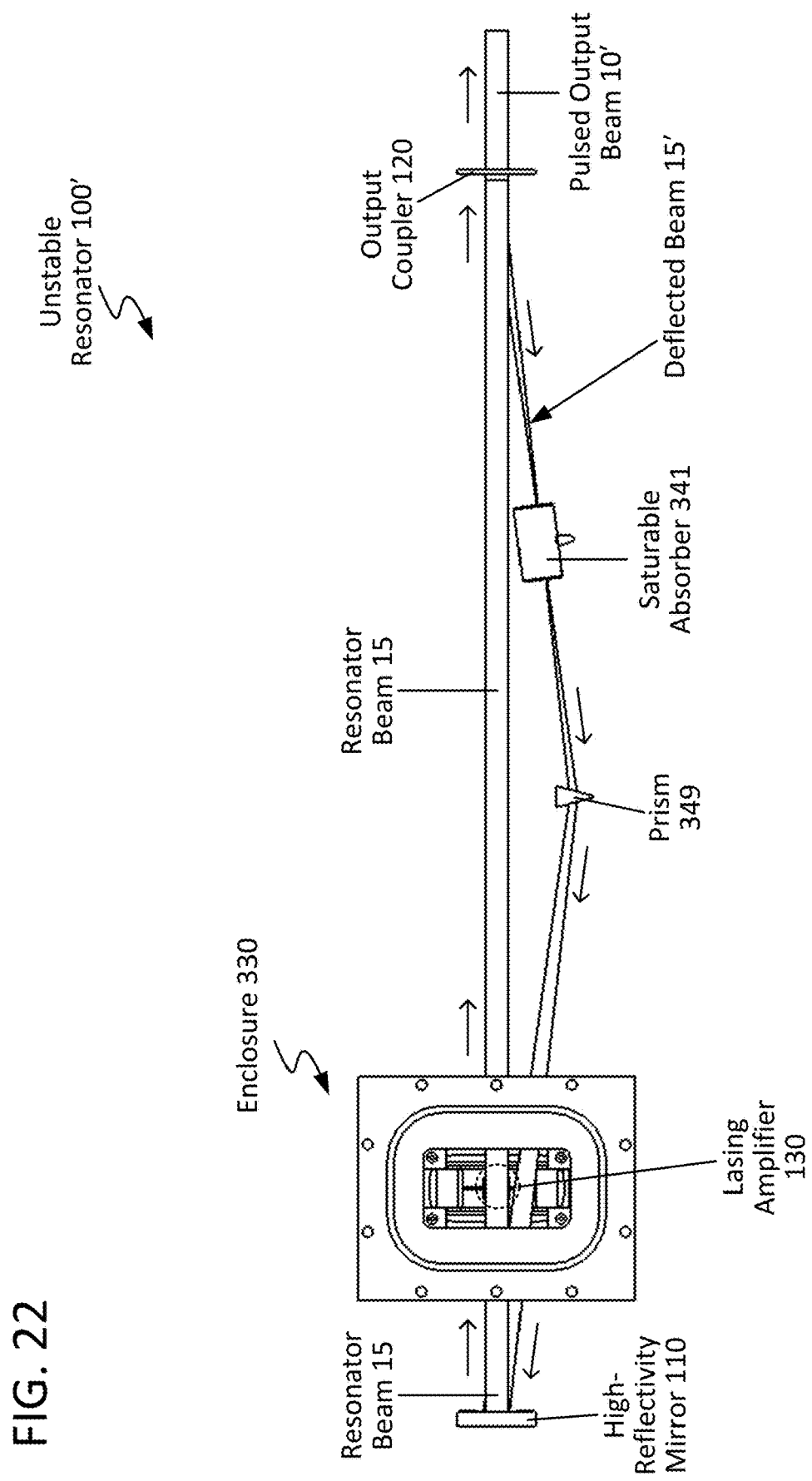
FIG. 22 is a schematic illustration of an unstable resonator including a prism in accordance with another embodiment of the present disclosure.

In accordance with some embodiments, chicane segment 340 optionally may include a prism 349 along its optical pathway (see FIG. 21). High-reflectivity mirror 110 and output coupler 120 may be angled towards prism 349 so as to provide physical separation between the forward and returning optical paths within unstable resonator 100'. In this arrangement, the clockwise and counterclockwise beams may have (a) a parallel resonator beam 15 propagating towards output coupler 120 and (b) a returning resonator beam 15 with a confocus located at the shared focus of high-reflectivity mirror 110 and output coupler 120. Placement of saturable absorber 341 at (or near) the confocus along the path towards prism 349 may favor the counter-clockwise rotation, for example.

In operation of unstable resonator 100', the properties of deflected beam 15' may have undergone defining in a variety of ways. First, saturable absorber 341 may have performed mode-locking of deflected beam 15' in production of pulsed output beam 10', amplifying temporal instabilities to yield a temporally narrow, pulsed beam and, in being positioned at a focus of the confocal optics, may have suppressed any counter-rotating beam modes that would have a parallel section at that point. Second, plane polarizer 343 and its associated waveplates 344, 345 together may have converted the circularly polarized beam to plane polarization, cleaned up that plane polarization, and then converted the plane polarization back to circular polarization. Third, EPR cell 346 may have interacted with the propagating deflected beam 15' and, depending on the chosen magnetic field, served as an EPR-based shutter providing transparency for an integer number (e.g., one, two, etc.) of pulses per full cycle of the beam pulse through the entire amplification circuit. And fourth, the mirror focal lengths may have magnified a small, central portion of the deflected beam 15' separated by output coupler 120 to fill the original beam envelope, reducing its intensity and seeding the next sequence of amplifications.

In some embodiments, an EPR-based beam shutter may be disposed in the primary folded beam adjacent to the amplifier. In these embodiments, the magnetic field of the EPR may be selected so that it can be transparent to the beam during each instant that the pulse is propagating forward through the amplifier. If the EPR has the cycle time of a single folded path, then it will be absorbing when the pulse returns to pass through the EPR shutter and the amplifier as it is optically focused to a point. During the return path, therefore, this EPR shutter will act as an additional saturable absorber.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A gaseous laser system configured in a ring layout to produce a pulsed output beam, the system comprising:

an unstable resonator configured to produce a resonator beam having at least one edge surface which coincides with at least one edge surface of an amplifier region of the system; and a saturable absorber configured to lock a longitudinal mode of the unstable resonator in production of the pulsed output beam;

wherein:

the unstable resonator comprises:

a first plurality of high-reflectivity mirrors disposed on a first side of the amplifier region; and a second plurality of high-reflectivity mirrors disposed on a second side of the amplifier region, opposite the first side; and a constituent mirror of the first plurality and a constituent mirror of the second plurality form a corresponding mirror pair separated from each other by a distance equal to a sum of their respective focal lengths.

2. The system of claim 1, wherein the unstable resonator further comprises an output coupler oriented at an angle that causes a portion of the resonator beam to be deflected out of alignment with a main optical axis of the unstable resonator to be received by the saturable absorber.

3. The system of claim 1, further comprising at least one of:

an electron paramagnetic resonance (EPR) cell disposed within a collimated region of a path of a portion of the resonator beam which has been deflected out of alignment with a main optical axis of the unstable resonator;

a periodic beam shutter configured to receive the portion of the resonator beam which has been deflected out of alignment with the main optical axis of the unstable resonator; and a prism disposed between the unstable resonator and the saturable absorber, wherein the prism is configured to receive the portion of the resonator beam which has been deflected out of alignment with the main optical axis of the resonator beam.

4. The system of claim 3, wherein at least one of:

the EPR cell is configured to enclose at least one of an alkali vapor, a buffer gas, and a quenching gas;

in operation of the system, the EPR cell is configured to be immersed in a magnetic field which is substantially transverse to a propagation direction of said deflected portion of the resonator beam; and the EPR cell is disposed along an optical pathway of said deflected portion of the resonator beam in a region where said deflected portion of the resonator beam exhibits circular polarization.

5. The system of claim 1, wherein:

the unstable resonator further comprises an output coupler having a reflective portion; and the system further comprises a chicane segment configured to receive a portion of the resonator beam which has been deflected out of alignment with a main optical axis of the unstable resonator, wherein the chicane segment comprises a pair of high-reflectivity chicane mirrors configured such that (a) a path length of a circuit from the second plurality of high-reflectivity mirrors to the reflective portion of the output coupler, through the pair of high-reflectivity chicane mirrors, and back to the second plurality of high-reflectivity mirrors is substantially equal to (b) a path length from the second plurality of high-reflectivity mirrors to the first plurality of high-reflectivity mirrors and back to the second plurality of high-reflectivity mirrors.

6. The system of claim 5, wherein the chicane segment further comprises:

a plane polarizer disposed along an optical pathway between the pair of high-reflectivity chicane mirrors;

an electron paramagnetic resonance (EPR) cell disposed along the optical pathway between the pair of high-reflectivity chicane mirrors; and a first waveplate disposed between the plane polarizer and the EPR cell along the optical pathway between the pair of high-reflectivity chicane mirrors.

7. The system of claim 6, wherein the chicane segment further comprises a second waveplate disposed either after the EPR cell or before the plane polarizer such that a preferred plane polarization is restored to said deflected portion of the resonator beam by the second waveplate.

8. The system of claim 1, wherein the system is at least one of:

configured to have a gas mixture flowing therethrough to provide the amplifier region, the gas mixture comprising a gas and an active lasing agent;

configured as a diode-pumped alkali laser (DPAL), wherein the active lasing agent comprises a vapor of an alkali metal; and configured for transverse pumping via at least one pump beam having at least one edge surface which coincides with the at least one edge surface of the resonator beam and the at least one edge surface of the amplifier region.

9. A gaseous laser system configured in a ring layout to produce a pulsed output beam, the system comprising:

an unstable resonator configured to produce a resonator beam having at least one edge surface which coincides with at least one edge surface of an amplifier region of the system; and a saturable absorber configured to lock a longitudinal mode of the unstable resonator in production of the pulsed output beam;

wherein the unstable resonator comprises an output coupler having:

a reflective interior portion which is configured to deflect a portion of the resonator beam out of alignment with a main optical axis of the unstable resonator to be received by the saturable absorber; and a light-transmissive perimeter portion which at least partially surrounds the reflective interior portion and which is configured to permit transmission of the pulsed output beam.

10. The system of claim 1, wherein the saturable absorber is configured to receive a portion of the resonator beam which has been deflected out of alignment with a main optical axis of the unstable resonator and to attenuate at least one beam mode therein.

11. The system of claim 10, wherein the saturable absorber is disposed at a focus of said deflected portion of the resonator beam.

12. The system of claim 9, further comprising at least one of:

an electron paramagnetic resonance (EPR) cell disposed within a collimated region of a path of the portion of the resonator beam which has been deflected out of alignment with the main optical axis of the unstable resonator;

a periodic beam shutter configured to receive the portion of the resonator beam which has been deflected out of alignment with the main optical axis of the unstable resonator; and a prism disposed between the unstable resonator and the saturable absorber, wherein the prism is configured to receive the portion of the resonator beam which has been deflected out of alignment with the main optical axis of the resonator beam.

13. The system of claim 12, wherein at least one of:
the EPR cell is configured to enclose at least one of an alkali vapor, a buffer gas, and a quenching gas;
in operation of the system, the EPR cell is configured to be immersed in a magnetic field which is substantially transverse to a propagation direction of said deflected portion of the resonator beam; and
the EPR cell is disposed along an optical pathway of said deflected portion of the resonator beam in a region where said deflected portion of the resonator beam exhibits circular polarization.

14. The system of claim 9, wherein the system is at least one of:
configured to have a gas mixture flowing therethrough to provide the amplifier region, the gas mixture comprising a gas and an active lasing agent;
configured as a diode-pumped alkali laser (DPAL), wherein the active lasing agent comprises a vapor of an alkali metal; and
configured for transverse pumping via at least one pump beam having at least one edge surface which coincides with the at least one edge surface of the resonator beam and the at least one edge surface of the amplifier region.

15. A gaseous laser system configured in a ring layout to produce a pulsed output beam, the system comprising:
an unstable resonator configured to produce a resonator beam having at least one edge surface which coincides with at least one edge surface of an amplifier region of the system;
a saturable absorber configured to lock a longitudinal mode of the unstable resonator in production of the pulsed output beam;
a plane polarizer configured to impose a preferred polarization on a portion of the resonator beam which has been deflected out of alignment with a main optical axis of the unstable resonator;
a first quarter-waveplate; and
a second quarter-waveplate having an orientation opposite that of the first quarter-waveplate such that a circulating beam returns to plane polarization with the preferred polarization.

16. The system of claim 15, wherein one of either the first quarter-waveplate or the second quarter-waveplate is configured to cause said deflected portion of the resonator beam to become substantially circularly polarized.

17. The system of claim 15, further comprising at least one of:
an electron paramagnetic resonance (EPR) cell disposed within a collimated region of a path of the portion of the resonator beam which has been deflected out of alignment with the main optical axis of the unstable resonator;
a periodic beam shutter configured to receive the portion of the resonator beam which has been deflected out of alignment with the main optical axis of the unstable resonator; and
a prism disposed between the unstable resonator and the saturable absorber, wherein the prism is configured to receive the portion of the resonator beam which has been deflected out of alignment with the main optical axis of the resonator beam.

18. The system of claim 17, wherein at least one of:
the EPR cell is configured to enclose at least one of an alkali vapor, a buffer gas, and a quenching gas;
in operation of the system, the EPR cell is configured to be immersed in a magnetic field which is substantially transverse to a propagation direction of said deflected portion of the resonator beam; and
the EPR cell is disposed along an optical pathway of said deflected portion of the resonator beam in a region where said deflected portion of the resonator beam exhibits circular polarization.

19. The system of claim 15, wherein the unstable resonator further comprises an output coupler oriented at an angle that causes the portion of the resonator beam to be deflected out of alignment with the main optical axis of the unstable resonator to be received by the saturable absorber.

20. The system of claim 15, wherein the system is at least one of:
configured to have a gas mixture flowing therethrough to provide the amplifier region, the gas mixture comprising a gas and an active lasing agent;
configured as a diode-pumped alkali laser (DPAL), wherein the active lasing agent comprises a vapor of an alkali metal; and
configured for transverse pumping via at least one pump beam having at least one edge surface which coincides with the at least one edge surface of the resonator beam and the at least one edge surface of the amplifier region.

\* \* \* \* \*